(12) United States Patent
Mueller

(10) Patent No.: US 8,154,815 B2
(45) Date of Patent: Apr. 10, 2012

(54) SYSTEMS AND METHODS FOR GENERATING EQUALIZATION DATA USING SHIFT REGISTER ARCHITECTURE

(75) Inventor: Brian K. Mueller, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 658 days.

(21) Appl. No.: 12/337,828

(22) Filed: Dec. 18, 2008

(65) Prior Publication Data

US 2010/0157768 A1    Jun. 24, 2010

(51) Int. Cl.
G11B 5/035 (2006.01)
G11B 5/09 (2006.01)
(52) U.S. Cl. ............................................. 360/65; 360/46
(58) Field of Classification Search .................... None
See application file for complete search history.

(56) References Cited

U.S. PATENT DOCUMENTS

| | | | |
|---|---|---|---|
| 5,262,904 A | 11/1993 | Tang et al. |
| 5,357,520 A | 10/1994 | Arnett et al. |
| 5,493,454 A | 2/1996 | Ziperovich et al. |
| 5,517,146 A | 5/1996 | Yamasaki |
| 5,583,705 A | 12/1996 | Ziperovich et al. |
| 5,781,358 A | 7/1998 | Hasegawa |
| 5,805,788 A | 9/1998 | Johnson et al. |
| 5,822,548 A | 10/1998 | Story et al. |
| 5,936,544 A | 8/1999 | Gonzales et al. |
| 5,986,830 A | 11/1999 | Hein |
| 5,999,355 A | 12/1999 | Behrens et al. |
| 6,043,942 A | 3/2000 | Cunningham et al. |
| 6,091,560 A | 7/2000 | Du |
| 6,130,794 A | 10/2000 | Christensen |
| 6,134,691 A | 10/2000 | Hirasaka |
| 6,141,168 A | 10/2000 | Takahashi et al. |
| 6,147,828 A | 11/2000 | Bloodworth et al. |
| 6,181,505 B1 | 1/2001 | Sacks et al. |
| 6,208,481 B1 | 3/2001 | Spurbeck et al. |
| 6,212,024 B1 | 4/2001 | Igarashi et al. |
| 6,243,031 B1 | 6/2001 | Jusuf et al. |
| 6,246,723 B1 | 6/2001 | Bliss et al. |
| 6,337,778 B1 | 1/2002 | Gagne |
| 6,396,651 B1 | 5/2002 | Grover |
| 6,404,572 B1 | 6/2002 | Hong |

(Continued)

FOREIGN PATENT DOCUMENTS

GB    2 320 866    6/1997

OTHER PUBLICATIONS

U.S. Appl. No. 12/199,325, filed Aug. 27, 2008, Mathew.

(Continued)

*Primary Examiner* — Daniell L Negron
*Assistant Examiner* — Regina N Holder
(74) *Attorney, Agent, or Firm* — Hamilton DeSanctis & Cha

(57) ABSTRACT

Various embodiments of the present invention provide systems and methods for data equalization. For example, various embodiments of the present invention provide methods for generating equalization data. The method includes inputting N bits of an equalization data pattern into respective stages of a shift register, wherein inputting the N bits occurs synchronous to a system data clock having a system data rate, and shifting the N bits of equalization data to next adjacent next stages of the shift register synchronous to an equalization data clock having an equalization data rate N times the system data rate.

20 Claims, 15 Drawing Sheets

U.S. PATENT DOCUMENTS

| | | | |
|---|---|---|---|
| 6,535,345 | B1 | 3/2003 | Shimoba |
| 6,563,655 | B1 | 5/2003 | Yamasaki et al. |
| 6,621,648 | B2 | 9/2003 | Leigthon et al. |
| 6,662,303 | B1 | 12/2003 | Toosky et al. |
| 6,671,244 | B2 | 12/2003 | Honma |
| 6,674,590 | B2 | 1/2004 | Ottesen et al. |
| 6,678,230 | B2 | 1/2004 | Miyashita et al. |
| 6,721,114 | B1 | 4/2004 | Sutardja et al. |
| 6,745,216 | B1 * | 6/2004 | Nakamura .................. 708/209 |
| 6,788,481 | B2 | 9/2004 | Fang et al. |
| 6,894,854 | B1 | 5/2005 | Carlson et al. |
| 6,912,682 | B1 | 6/2005 | Aoki |
| 6,934,100 | B2 | 8/2005 | Ueno |
| 6,937,415 | B2 | 8/2005 | Galbraith et al. |
| 7,012,772 | B1 | 3/2006 | Vis |
| 7,079,342 | B1 | 7/2006 | Han et al. |
| 7,092,179 | B2 | 8/2006 | Yamanouchi |
| 7,123,429 | B2 | 10/2006 | Musungu et al. |
| 7,126,773 | B1 | 10/2006 | Taratorin |
| 7,193,802 | B2 | 3/2007 | Cideciyan et al. |
| 7,248,424 | B2 | 7/2007 | Ueno |
| 7,256,954 | B2 | 8/2007 | Serizawa |
| 7,262,928 | B1 | 8/2007 | Oberg |
| 7,271,753 | B1 | 9/2007 | Padukone et al. |
| 7,308,057 | B1 | 12/2007 | Patapoutian |
| 7,440,224 | B2 | 10/2008 | Ehrlich et al. |
| 7,495,854 | B2 | 2/2009 | Hutchins |
| 7,542,227 | B2 | 6/2009 | Che et al. |
| 7,715,135 | B1 | 5/2010 | Sutardja et al. |
| 7,733,591 | B2 | 6/2010 | Bottemiller et al. |
| 2002/0159350 | A1 | 10/2002 | Ogura |
| 2003/0026354 | A1 | 2/2003 | Chang et al. |
| 2003/0046541 | A1 | 3/2003 | Gerdes et al. |
| 2003/0048564 | A1 | 3/2003 | Koller et al. |
| 2005/0117243 | A1 | 6/2005 | Serizawa et al. |
| 2006/0061496 | A1 | 3/2006 | Stein et al. |
| 2006/0062125 | A1 | 3/2006 | Horie et al. |
| 2006/0176947 | A1 | 8/2006 | Lim |
| 2006/0224901 | A1 | 10/2006 | Lowe |
| 2006/0232871 | A1 * | 10/2006 | Brittenham .................. 360/65 |
| 2007/0008140 | A1 | 1/2007 | Saarisalo et al. |
| 2007/0041115 | A1 | 2/2007 | Lee |
| 2007/0047120 | A1 | 3/2007 | DeGroat |
| 2007/0076313 | A1 | 4/2007 | Hutchins et al. |
| 2007/0140088 | A1 | 6/2007 | Hino et al. |
| 2007/0246546 | A1 | 10/2007 | Yoshida |
| 2008/0031114 | A1 | 2/2008 | Hong et al. |
| 2008/0037153 | A1 | 2/2008 | Yoshizawa |
| 2008/0081382 | A1 | 4/2008 | Mathew |
| 2009/0161245 | A1 | 6/2009 | Mathew |

OTHER PUBLICATIONS

U.S. Appl. No. 12/273,265, filed Nov. 18, 2008, Mathew.
U.S. Appl. No. 12/337,775, filed Dec. 18, 2008, Mathew.
U.S. Appl. No. 12/337,805, filed Dec. 18, 2008, Mueller.
U.S. Appl. No. 12/337,850, filed Dec. 18, 2008, Mueller.
Cho and Lee, "An Estimation Technique for Nonlinear Distortion In High Density Magnetic recording Channels", IEEE Transactions on Magnetics, vol. 34, No. 1, pp. 40-44 Jan. 1998.
Degroat et al., "Experimental Characterization of Media Noise Based on Equalized Synchronized Drive Data", IEEE Trans. Magnetics, vol. 37, No. 2, pp. 633-638, Mar. 2001.
Farhang-Boroujeny, Adaptive Filters: Theory and Applications. John Wiley & Sons Ltd, 1998, Chapter 11. pp. 373-379.
Kavcic and Patapoutian, "A Signal-Dependent Autoregressive Channel Model", IEEE Trans. Magnetics, vol. 35 No. 5, pp. 2316-2318, Sep. 1999.
Lin et al. "An estimation technique for accurately modelling the magnetic recording channel including nonlinearities." IEEE Trans. Mag, vol. 25, No. 5, pp. 4084-4086, Sep. 1989.
Moon, J., "Signal-to-Noise Ratio Definition for Magnetic Recording Channels With Transition Noise", IEEE Trans. Magnetics, vol. 36, No. 5, pp. 3881-3883, Sep. 2000.
Palmer et al, "Identification of nonlinear write effects using pseudo-random sequences" IEEE Trans. Magnetics, vol. 23 No. 5, pp. 2377-2379, Sep. 1987.
Partovi; et al., "Flow-Through Latch and Edge-Triggered Flip-Flop Hybrid Elements"; Feb. 8, 1996; pp. 138-139; Solid-State Circuits Conf Digest of Technical Papers IEEE.
Tokumasu et al. "A New Reduced Clock-Swing Flip-Flop (NDKFF)," Corporate Research & Development Center, Toshiba Corporation. IEEE Feb. 2002 Custom Intergrated Circuits Conf.
Wood and Donaldson, "The Helical-Scan Magnetic Tape Recorder as a Digital Communication Channel", IEEE Transactions on Magnetics, vol. MAG-15, No. 2, pp. 935-943 Mar. 1979.

* cited by examiner

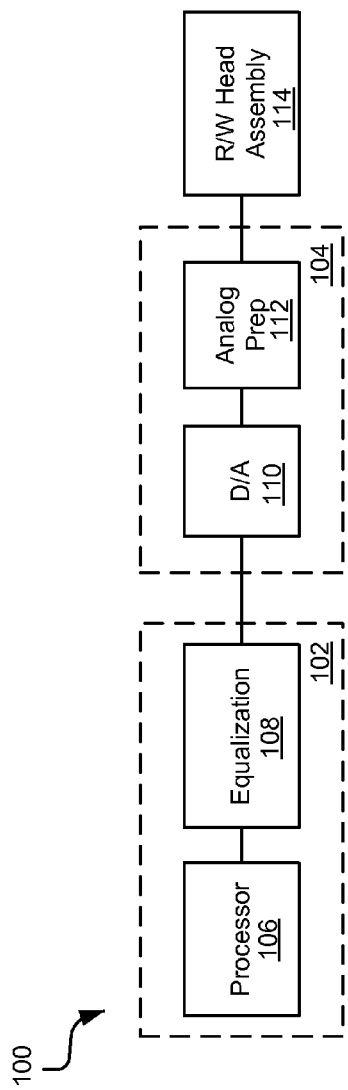
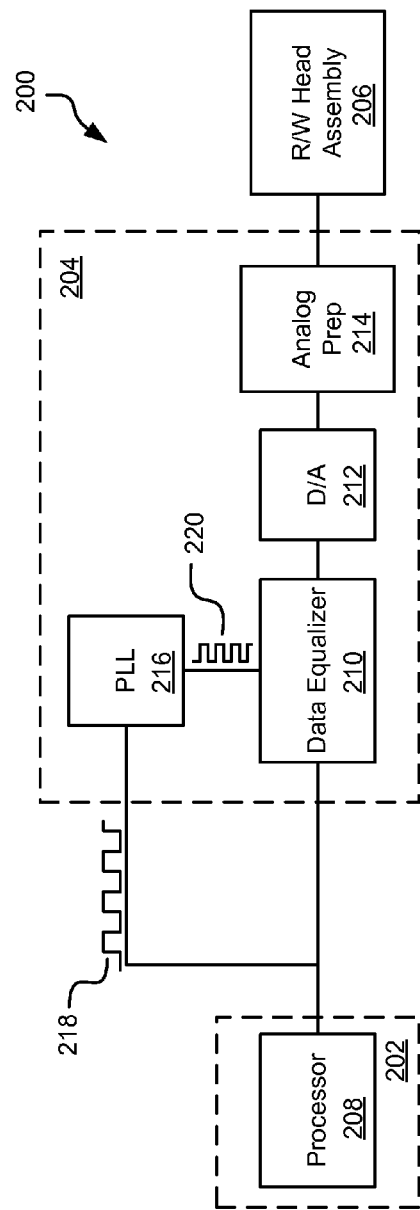
Fig. 1 (Prior Art)
Fig. 2

SYSTEMS AND METHODS FOR GENERATING EQUALIZATION DATA USING SHIFT REGISTER ARCHITECTURE

BACKGROUND OF THE INVENTION

The present inventions are related to systems and methods for equalizing data, and more particularly to systems and methods for controlling an equalization process.

Storage devices generally include a read/write assembly including a write head operable to write data to a storage medium, such as tape or disk. Data that is to be written to the medium is generated by a system, such as a computer. The data comes from the computer in digital form, and is converted into analog form, prior to being sent to the write head. Physical phenomena can adversely affect the analog signal at the head. For example, when the digital data is constant (e.g., a steady stream of high or low voltage levels), time domain drift can occur.

Equalization is a way to prevent drift. Equalization compensates for analog effects that interfere with the signal at the write head by changing the time domain pulse widths and introducing toggling into the data stream. For example, a single bit of logical value 'one' may be replaced with four equalization bits, where three of the bits are a logical 'one' and the fourth bit is a logical 'zero'. In conventional systems where equalization is used, the equalization process is usually integrated close to, or even within, the processor (e.g., the storage device control processor) that is generating the digital data. This arrangement renders conventional approaches to equalization quite limited in the flexibility and extent to which equalization can be applied.

FIG. 1 illustrates a simplified prior art storage system architecture 100 that employs equalization. The system of FIG. 1 includes a controller chip 102 and a preconditioning chip 104. The controller chip 102 includes a processor unit 106 and an equalization unit 108. The preconditioning chip 104 includes a digital to analog converter 110 and an analog preparation unit 112. The processing unit 106 provides data to the equalization unit 108, which equalizes the data and sends the equalized data to the preconditioning chip 104, which converts the data to analog and prepares the data for delivery to the write head 114. The write head 114 then writes the data to storage media (not shown).

In the architecture of FIG. 1, the preconditioning chip 104 is in close proximity to the write head 114 to accommodate the requisite high data rates (e.g., 600 MHz-1 GHz) for writing data. In some cases, the preconditioning chip 104 is integrated with the write head 114. The preconditioning chip 104 and write head 114 are formed of a semiconductor material, such as Silicon Germanium (SiGe), which is able to handle the higher data rates. By contrast, the controller chip 102 is relatively far from the write head 114 and, to reduce costs, is generally formed of a semiconductor material, such as complementary metal-oxide-semiconductor (CMOS) Silicon, which does not need to operate at the higher data rates employed by the write head.

The distance of the controller unit 102 from the preconditioning chip 104, and the lower speed material of the controller unit 102, gives rise to limitations with respect to equalization. A specific limitation is the maximum data rate that can be used to transmit data from the controller chip 102 to the preconditioning chip 104. The degree of equalization is limited by the system clock (e.g., 200 MHz) of the controller chip 102. In addition, the distance between the controller chip 102 and the preconditioning chip 104 limits the rate at which data can be transmitted therebetween with a sufficiently low bit error rate. As a result, the degree of equalization is fairly limited in the conventional architecture.

Hence, for at least the aforementioned reasons, there exists a need in the art for advanced systems and methods for providing equalization of data.

BRIEF SUMMARY OF THE INVENTION

The present inventions are related to systems and methods for equalizing data, and more particularly to systems and methods for controlling an equalization process.

Embodiments of the present invention relate to providing equalization data representing system data to be written to a storage medium. More specifically, embodiments relate to generating a load pulse for loading equalization data. More specifically still, embodiments relate to loading equalization bits into a shift register. More specifically still, embodiments relate to shifting the equalization bits out at a data rate that is a multiple of the system data rate.

An embodiment of a semiconductor device includes a shift register including at least N stages, wherein each stage is can load a bit of equalization data in response to a load pulse and shift the bit to a next stage or to a shift register output in response to a rising edge of a first clock having a first data rate, in which the load pulse is used to select between loading a new bit of equalization data or a bit from a prior stage at each stage and a load pulse generator operable to assert the load pulse in response to a rising edge of a second clock having a second data rate, and de-assert the load pulse prior to the rising edge of the first clock, wherein the first data rate is N times the second data rate. Each stage of the shift register can include a multiplexer operable to select between the new bit of equalization data and the bit from a prior stage based on the load pulse. The second clock may be a system data clock used to clock bits of system data and the first clock is an equalization data clock used to clock bits of equalization patterns representing one or more of the system data. Each stage may include a hybrid flip-flop, in which the first clock is input to a clock port of the hybrid flip-flop and the output of the multiplexer in each stage is input to a data port of the hybrid flip-flop.

In an embodiment of the semiconductor device the value N is selectable. In some embodiments, N can be selected as a three, four or five. According to at least one embodiment, the semiconductor device is in operable to receive system data from a processor outputting system data at the second data rate, and wherein the processor consists of Silicon and the semiconductor device is composed of Silicon Germanium.

An embodiment of a storage device includes a read/write head assembly operable to write data to a storage medium, a processor operable to generate system data on a plurality of parallel data channels at a system clock rate, and a semiconductor device operable to receive the system data and generate equalization data corresponding to each parallel channel, wherein the equalization data is generated at an equalization clock rate that is N times the system clock rate, wherein the semiconductor device includes a shift register associated with each data channel, wherein each shift register includes at least N stages, wherein each stage is operable to select between loading a new equalization data bit or a bit from a prior stage. Each stage of each shift register may be operable to select whether to load a new equalization data bit or a bit from a prior stage based on a load pulse, and wherein the semiconductor device further comprises a load pulse generator operable to generate the load pulse, wherein the load pulse rises in response to a rising edge of the system clock and falls prior to a next rising edge of the equalization clock. Each stage of each shift register may include a multiplexer operable to select between a bit from a prior stage and a new equalization bit.

Further, each stage of each shift register may include a hybrid flip-flop, wherein a clock port of each hybrid flip-flop receives the equalization clock and a data port of the each hybrid flip-flop receives the output of a multiplexer of the stage. The storage device may further include selection means for selecting N. N may further be selected from a group comprising 3, 4 or 5.

An embodiment of a method for generating equalization data includes inputting N bits of an equalization data pattern into respective stages of a shift register, wherein inputting the N bits occurs synchronous to a system data clock having a system data rate, and shifting the N bits of equalization data to next adjacent next stages of the shift register synchronous to an equalization data clock having an equalization data rate N times the system data rate. The method may further include generating a load pulse operable to select a new equalization bit at each stage or a bit from a prior stage. Generating the load pulse may include generating a rising edge of the load pulse in response to receiving a rising edge of the system data clock and generating a falling edge of the load pulse prior to receiving a next rising edge of the equalization data clock. Generating the load pulse may further include generating one or more delayed versions of the system data clock.

The method may further include receiving a selection of N, indicating a level of equalization. Receiving the selection of N comprises receiving the selection from a user. The method may further include generating the equalization pattern based on N.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1 depicts a prior art approach to providing equalization;

FIG. 2 depicts a system for providing equalization according to various embodiments of the present invention;

DETAILED DESCRIPTION OF THE INVENTION

Figure 6:
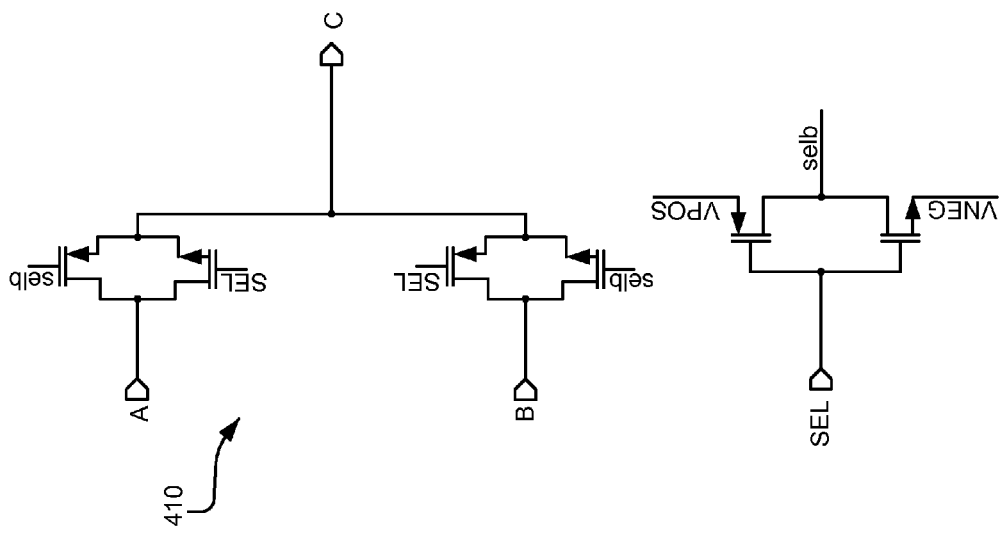
FIG. 6 depicts a multiplexer for use in the shift register shown in FIG. 4 according to one or more embodiments of the present invention.

The present inventions are related to systems and methods for equalizing data, and more particularly to systems and methods for controlling an equalization process.

Various embodiments of the present invention provide systems and methods for providing equalization to a data pattern destined to be written to a storage medium. Such storage media may include, but are not limited to, magnetic storage media such as, for example, a disk platter in a hard disk drive system and/or a tape. In other embodiments of the present invention, systems and methods for providing equalization to a data pattern destined to be written via a transmission channel are provided. Such transmission channels may include, but are not limited to, a wireless transmission channel, an optical transmission channel, and/or a wired transmission channel.

Various embodiments of the present invention provide semiconductor devices that include a shift register and a load pulse generator. The shift register includes at least N stages, where each stage is operable to load a bit of equalization data in response to a load pulse and to shift the bit in response to a rising edge of a first clock having a first data rate. The load pulse is used to select between loading a new bit of equalization data or a bit from a prior stage. The load pulse generator is operable to assert the load pulse in response to a rising edge of a second clock having a second data rate, and to de-assert the load pulse prior to the rising edge of the first clock, wherein the first data rate is N times the second data rate.

Other embodiments of the present invention provide semiconductor devices that include a number, X, of equalization encoders. Each of the equalization encoders receives data from a respective channel at a first data rate, and provides an N bit equalization pattern at a second data rate. The second data rate is N times the first data rate. The semiconductors further include X shift registers. Each of the shift registers is operable to receive N equalization bits from an associated equalization encoder and to shift the N equalization bits out at the second data rate.

In particular embodiments of the present invention, a defined load pulse is generated and used for loading an equalization pattern into a shift register that is later shifted out for writing to a storage medium or for transmission via a transmission channel. Particular embodiments of the present invention are tailored for shifting out an equalized data pattern at a data rate that is much higher than the data rate at which the non-equalized pattern is received. In some such cases, the equalized data pattern includes a number of bit periods that is greater than the number of bit periods of the non-equalized data pattern. In one particular case, the number of bit periods of the equalized data pattern is a multiple of the number of bit periods of the non-equalized data pattern, and the multiple is the same multiple for the input and output data rates.

As just one of many advantages, some embodiments of the present invention facilitate placement of the equalizer closer to a data transfer point, such as, a read/write head assembly. Based on the disclosure provided herein, one of ordinary skill in the art will recognize a myriad of other advantages that may be achieved through the various embodiments of the present invention.

Turning to FIG. 2, a storage device architecture 200 is illustrated that employs equalization according to some embodiments of the present invention. The architecture 200 includes a controller 202 that includes a processor 208. Processor 208 may be, for example, a microprocessor or microcontroller that provides non-equalized data to a semiconductor device 204. Controller 202 may be implemented on a semiconductor substrate. Semiconductor device 204 provides data to a read/write head assembly 206, which writes the data to a storage medium (not shown). The non-equalized digital data is communicated on parallel channels to the semiconductor device 204, which preconditions the data for communication to the read/write head assembly 206. It should be noted that while architecture 200 is particular to a storage application, a similar architecture may be used for a data transmission application by swapping the read/write head assembly 206 for a transmitter (not shown).

In the embodiment of FIG. 2, semiconductor device 204 includes a data equalizer circuit 210, a digital to analog converter circuit 212, analog preparation unit 214 and phase lock loop circuit 216. In general, the data equalizer circuit 210 receives data from one or more parallel data channels and generates equalization data for each of the respective channels whenever an equalization criteria is met. Such equalization involves replacing each of selected bits received from a respective data channel with a corresponding equalization pattern. In the embodiments shown and described herein, the equalization pattern may include three, four or five bits. The number of bits in the equalization pattern is referred to as the degree or level of equalization. In some embodiments, the degree of equalization is user selectable. It should be noted that while three, four and five bit equalization is discussed herein, that one of ordinary skill in the art will recognize that other levels of equalization may be implemented in accordance with different embodiments of the present invention.

The data equalizer circuit 210 outputs an equalization pattern when criteria are met with respect to the data input to the data equalizer circuit 210. Such criteria may be any criteria known in the art for determining whether equalization is desirable including, but not limited to, the particular toggle pattern of bits preceding and/or succeeding a given bit. The equalized pattern is then passed to the digital to analog converter circuit 212. If the criteria are not met, the data input to the data equalizer circuit 210 is passed through to the digital to analog converter circuit 212. The digital to analog converter circuit 212 receives the output (whether equalized or not) from the data equalizer circuit 210 and converts the data to an analog form. The analog preparation unit 214 conditions the analog data for transfer to the read/write head assembly 206. The analog preparation unit 214 may filter, amplify or otherwise condition the analog signal, as will be understood by those of skill in the art.

The processor 208 processes data according to a system clock 218. The frequency of the system clock 218 corresponds to a typical computer system data rate, such as, but not limited to 200 MHz. Based upon the disclosure provided herein, one of ordinary skill in the art will recognize a variety of frequencies that the system clock 218 may exhibit. The data equalizer circuit 210 receives data from the controller at the system data rate. As discussed above, the data equalizer circuit 210 operates to output multiple equalization bits in place of a single bit. Because the data equalizer circuit 210 replaces a single bit with multiple bits in an equalization pattern, the data equalizer circuit 210 outputs data at a frequency that is greater than the system data rate. As such, the pulse widths of bits output from the data equalizer circuit 210 may be time domain adjusted.

The phase lock loop circuit 216 receives a system clock 218 from the controller 202 and generates another clock 220 at a higher frequency, which is used for data equalization. The equalization clock 220 is used by the data equalizer circuit 210 to output each bit of the equalization pattern at a rate that is a multiple of the system clock 218 rate. The multiple of the system clock 218 rate depends on the degree of equalization being applied. For example, if the equalization pattern includes 3 bits, the equalization clock 220 rate is substantially equal to 3 times the system clock 218 rate; if the equalization pattern includes 4 bits, the equalization clock 220 rate is substantially equal to 4 times the system clock 218 rate; and so on. A particular embodiment of a data equalizer circuit 210 is illustrated in FIG. 3 and discussed further below.

Figure 3:
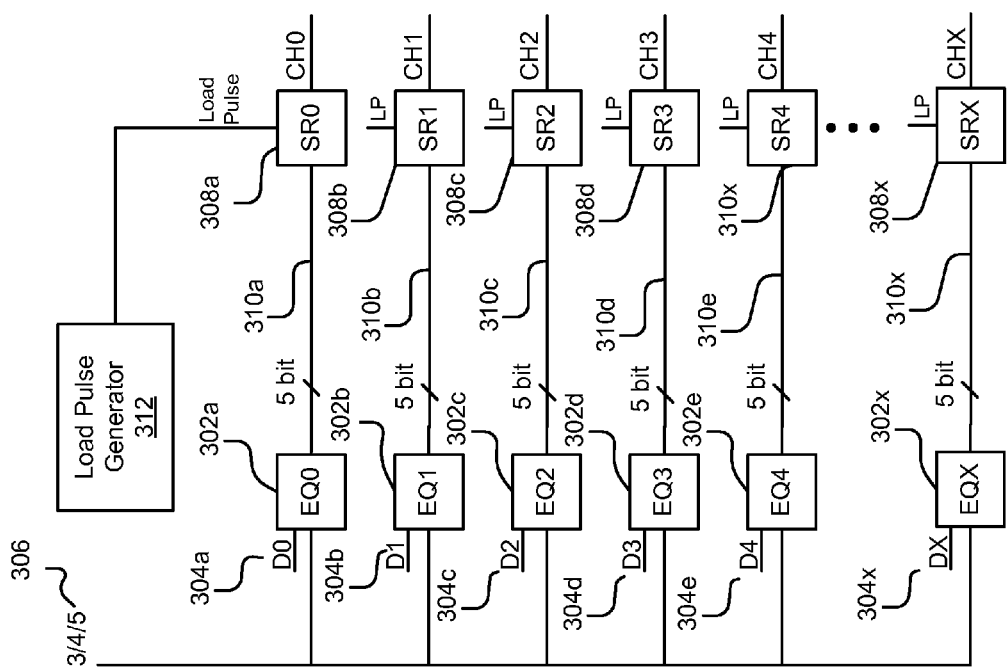
FIG. 3 depicts a data equalizer according to some embodiments of the present invention.

FIG. 3 illustrates a data equalizer circuit 300 according to some embodiments of the invention. The data equalizer circuit 300 includes an equalization encoder circuit 302 for each data channel 304. In general, there are 'X' data channels, labeled D0-DX. The value of 'X' generally corresponds to the number of channels of data output from the processor 208. The number of channels may be, for example, sixteen or thirty-two. Based upon the disclosure provided herein, one of ordinary skill in the art will recognize other numbers of data channels that may be used in accordance with different embodiments of the present invention. Each equalization encoder circuit 302 receives series of data bits from the associated channel and outputs an equalization pattern when one or more criteria are met. Again, such criteria may be any criteria known in the art for determining whether equalization is desirable including, but not limited to, the particular toggle pattern of bits preceding and/or succeeding a given bit. A selector input 306 enables selection of the number of bits in the equalization pattern. Selector input 306 may be hardware (e.g., an external switch) or software configurable. In the illustrated embodiment, the equalization pattern can be selected to be three, four or five bits. Again, it should be noted that other levels of equalization are possible in accordance with different embodiments of the present invention.

Figure 7:
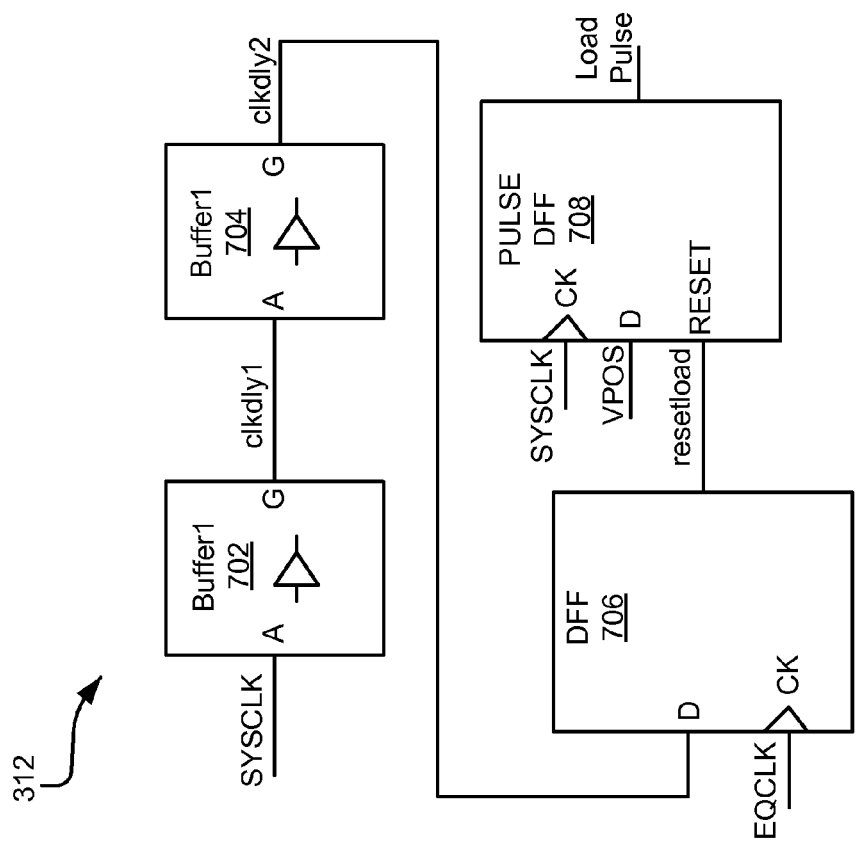
FIG. 7 depicts a load pulse generator according to various embodiments of the present invention.

The outputs of the equalization encoder circuits 302 are input to respective shift register circuits 308 via five bit parallel channels 310. If fewer than five bits are selected for the equalization pattern, the lowest significant bits are shifted into the shift register circuits 308. A load pulse generator circuit 312 generates a load pulse when the equalization pattern is to be shifted into the shift register circuits 308. The load pulse signal is delivered to a load input of the shift register circuits 308. An embodiment of a load pulse generator is shown in FIG. 7 and discussed further below. It should be noted that the load pulse generator circuit 312 may be capable of generating a distinct load pulse for each of the respective shift register circuits 308 allowing for independent operation of each of the channels.

Figure 4:
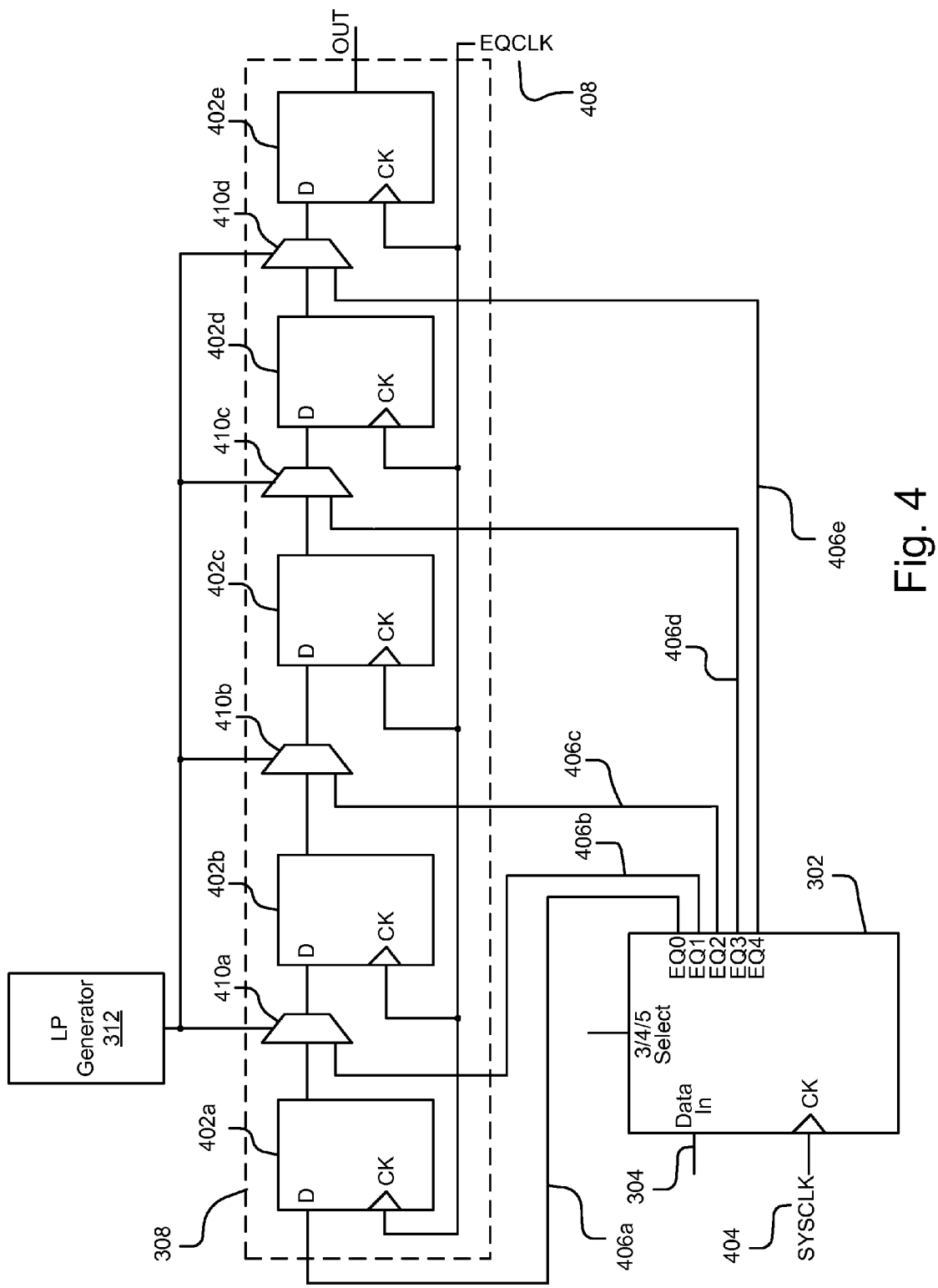
FIG. 4 depicts a shift register in combination with an equalization encoder and a load pulse generator according to one or more embodiment of the present invention.

Turning to FIG. 4, an embodiment of a shift register circuit 308 is depicted. Shift register circuit 308 includes a number of stages (in this cases five stages). Equalization encoder circuit 302 receives input data channel 304, equalization level selector input 306 and system clock 404. Equalization encoder circuit 302 outputs a three to five bit equalization pattern on five parallel outputs 406, labeled EQ0-EQ4. EQ0 represents the least significant bit of the equalization pattern and EQ4 represents the greatest significant bit in the equalization pattern. Each of the equalization bits in the pattern is input into an associated stage of the shift register 308. In some cases, each stage of the shift register circuit 308 includes a hybrid flip-flop circuit 402. Each stage inputs either a bit from the prior stage or a bit from the equalization pattern based in part on an equalization clock 408. Equalization clock 408 is an integer multiple of the system clock 404.

In the illustrated embodiment, all stages except the first stage include data selectors that select between data from the prior stage and equalization data. In some embodiments of the present invention, the data selectors are implemented as multiplexer circuits 410. The least significant equalization pattern bit, EQ0, is input directly to hybrid flip-flop circuit 402a (the first stage). When load pulse generator 312 asserts the load pulse signal, other equalization bits, EQ1 through EQ4 (later stages), are input to associated multiplexer circuits 410. After the equalization bits are loaded into the shift register circuit 308, they are shifted to subsequent stages of the shift register 308, or output (where the bit is in the last stage 402e), synchronous to equalization clock 408.

Figure 5:
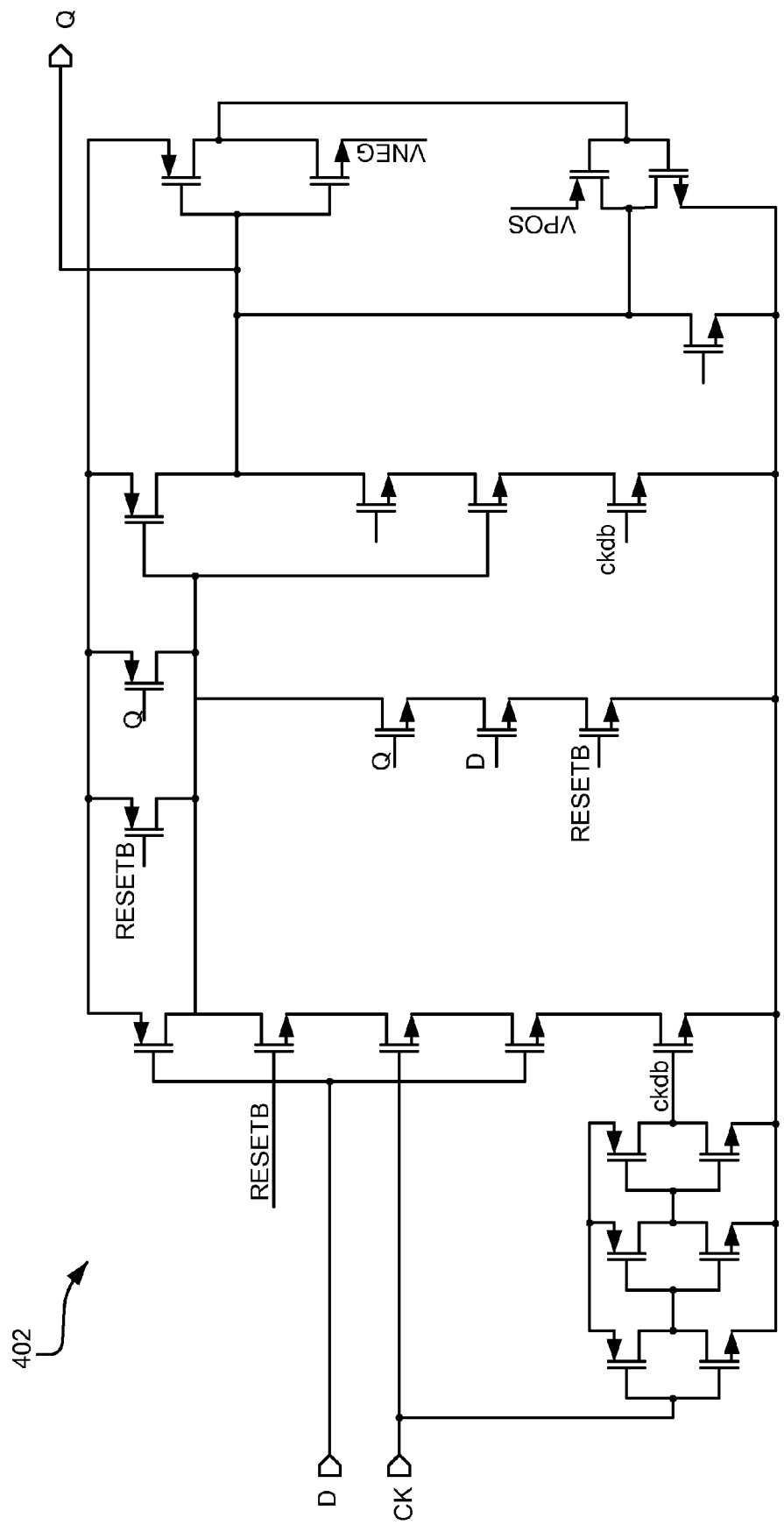
FIG. 5 depicts a hybrid flip-flop that may be used in the shift register shown in FIG. 4 according to some embodiments of the present invention.

FIG. 5 illustrates an embodiment of a hybrid flip-flop circuit 402 that may be used in shift register circuit 308. The hybrid flip-flop circuit 402 shown in FIG. 5 is similar to the NAND-type Keeper Flip-Flop (NDKFF) shown and described in article "A New Reduced Clock-Swing Flip-Flop: NAND-type Keeper Flip-Flop (NDKFF)", Tokumasu et al., IEEE, Custom Integrated Circuits Conference, 2002. The entirety of the aforementioned reference is incorporated herein by reference for all purposes. In the hybrid flip-flop circuit 402, RESETB is an asynchronous reset. Because the shift register 308 can be used with a relatively high frequency clock, the hybrid flip-flop circuit 402 allows for a negative setup time that improves timing margin over standard t-gate flip-flops. In one case, the relatively high frequency clock is a 1 GHz clock. Based on the disclosure provided herein, one of ordinary skill in the art will recognize various clock frequencies that may be used to clock hybrid flip-flop circuit 402.

FIG. 6 illustrates an embodiment of a multiplexer 410 that may be used in shift register 308. Input 'SEL' is the selector input of the multiplexer 410. Inverter 602 includes P-channel transistor 604 in parallel with N-Channel transistor 606. The output of inverter 602 is 'selb'. In this arrangement, when SEL is asserted, input A is selected to drive the output C, and when 'selb' is asserted, input B is selected to drive the output C. In this embodiment, the multiplexer 410 is analog, which further reduces delay. By using the hybrid flip-flop circuit 402 and the analog multiplexer 410, the relatively short pulse from the load pulse is sufficient time to allow for loading new equalization data. In addition, the hybrid flip-flop circuit 402 and multiplexer 410 can be disabled fast enough to allow for high-speed shifting of the equalization data from stage to stage in the shift register 308 at a 1 GHz rate.

Figure 10:
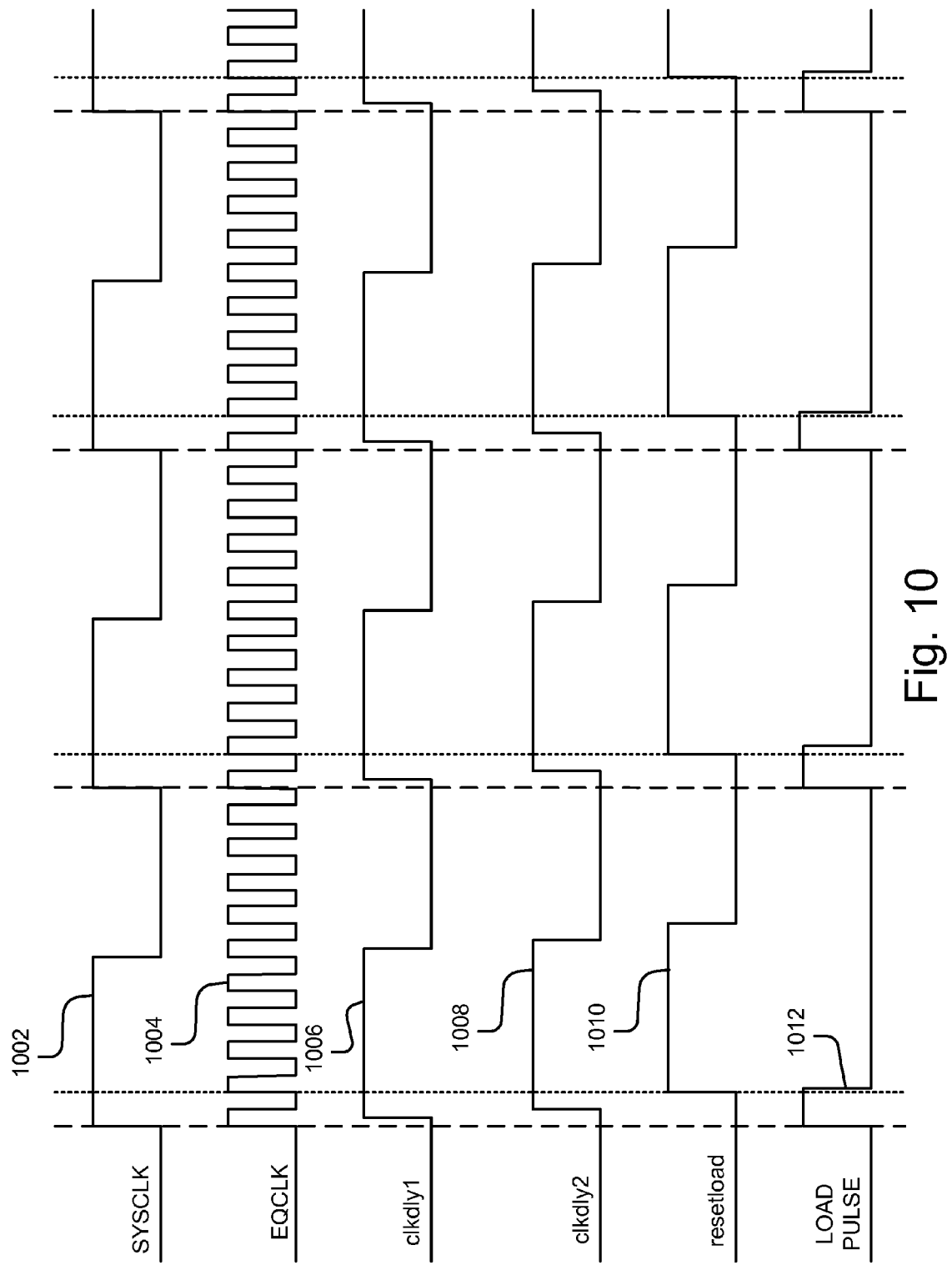
FIG. 10 depicts signals used in and generated by the load pulse generator according to particular embodiments of the present invention.

FIG. 7, discussed here with reference to FIG. 10, illustrates a load pulse generator 312 according to one embodiment. The load pulse generator 312 includes a first clock buffer 702, a second clock buffer 704, a digital flip-flop 706 and a pulse flip-flop 708. The system clock 1002 is input into the first clock buffer 702. Based on the system clock 1002 (FIG. 10), the first clock buffer 702 outputs a delayed version of system clock 1002, labeled 'clkdly1' 1006. Signal clkdly1 1006 is input to the second clock buffer 704. The second clock buffer 704 receives 'clkdly1' 1006 and outputs a delayed version of clkdly1 1006, labeled 'clkdly2' 1008.

Signal clkdly2 1008 and equalization clock 1004 are input to the data input port (D) and the clock input port (CK), respectively, of the digital flip-flop (DFF) 706. Equalization clock 1004 is a multiple of the system clock 1002. The multiple depends upon the level of equalization (e.g., 3-bit, 4-bit or 5-bit) being performed. In the embodiment of FIG. 10, the equalization level is 5, so the frequency of the equalization clock 1004 is five times the frequency of the system clock 1002. For example, the system clock frequency may be 200 MHz and the equalization clock frequency may be 1 GHz.

Based on clkdly2 1008 and equalization clock 1004, DFF 706 outputs a signal labeled 'resetload' 1010. Signal resetload 1010 transitions high when clkdly2 1008 is high and equalization clock 1004 transitions high. Signal resetload 1010 is input to the RESET input port of the pulse DFF 708. System clock 1002 is input to the CK input port of the pulse DFF 708. The data port, D, of the pulse DFF 708 is connected to positive voltage level, VPOS.

Based on resetload 1010 and system clock 1002, pulse DFF 708 outputs the load pulse signal 1012. Load pulse signal 1012 transitions high when system clock 1002 transitions high because input D is connected to VPOS. Load pulse signal 1012 transitions low (i.e., resets) when signal resetload 1010 transitions high. Importantly, load pulse signal 1012 remains high long enough for the new equalization pattern to be loaded into the shift registers, but resets low prior to the next rising edge of the equalization clock 1004, which is input to the stages of the shift registers. After new equalization data bits have been loaded, the equalization clock 1004 continues to clock the stages of the shift register 308, thereby shifting the equalization bits to the next stages or output. In one embodiment, in the 3-bit and 4-bit equalization modes the most significant bits are shifted outside of the load pulse window to conserve power. In this manner, the equalization pattern is first loaded into the shift register and then shifted at a rate corresponding to the equalization clock 1004.

Figure 8:
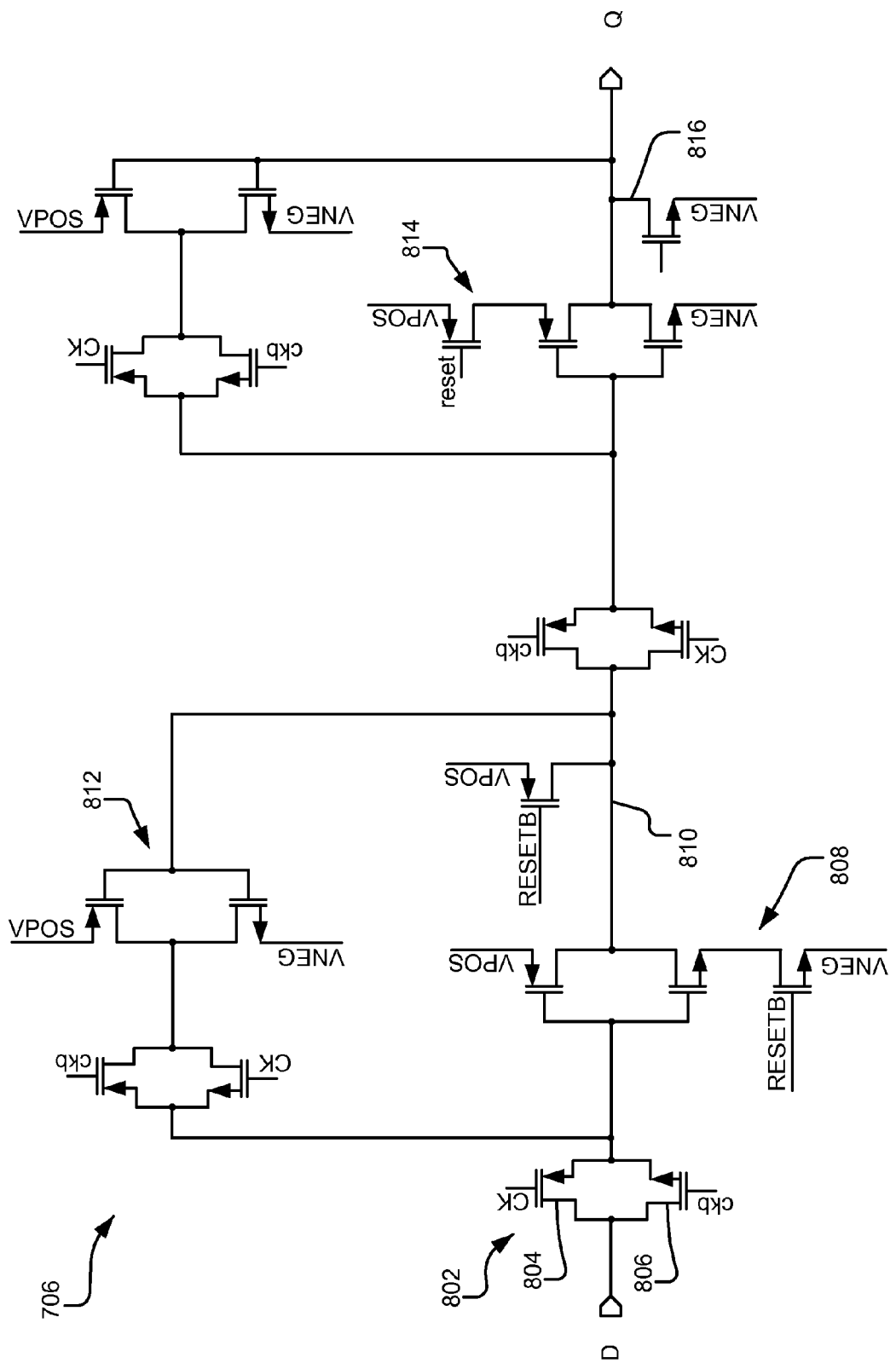
FIG. 8 depicts a digital flip-flop for use in the load pulse generator shown in FIG. 7.

FIG. 8 illustrates a digital flip-flop 706 according to one embodiment. Input, D, to the DFF 706 is the system clock 1002. Output, Q, of the DFF 706 is resetload signal 1010. The illustrated embodiment provides for a fast rising edge on the output, Q. DFF 706 includes full transmission gate (T-gate) 802, which includes an N-channel transistor 804 and a P-channel transistor 806 in parallel. Asynchronous reset is input to N-channel transistor 808. Master node 810 is fed back through inverter 812 to latch the data.

P-channel transistors 814 are sized are pull-ups to positive source, VPOS. Preferably, P-channel transistors 814 are relatively large compared to N-channel transistor 816 to provide for a fast rising edge on the output, Q. In this arrangement, signal resetload 1010 has a quick, clean rising edge.

Figure 9:
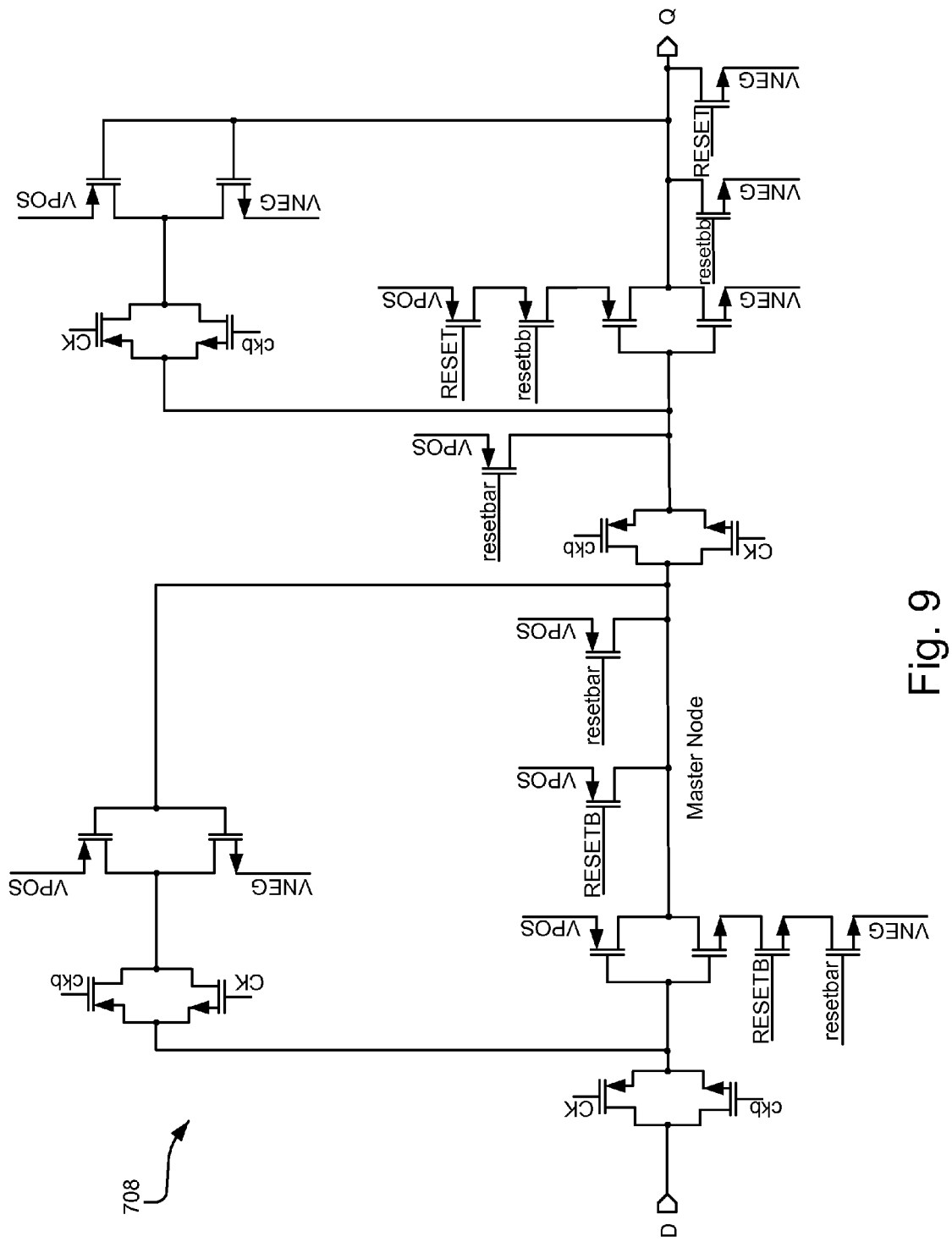
FIG. 9 depicts a pulse digital flip-flop for use in the load pulse generator shown in FIG. 7.

FIG. 9 depicts a pulse digital flip-flop for use in the load pulse generator shown in FIG. 7. Input D is connected to VPOS, and so is always logically high. The pulse DFF 708 has a similar general configuration as the DFF 706 with some differences. Importantly, the pulse DFF 708 is designed to provide a fast falling edge on the output, Q, which is the load pulse signal 1012. As discussed above, the rising edge of resetload signal 1010 from DFF 706 causes output Q to fall. Signal resetload 1010 is input to the RESET port connected to N-Channel transistor 902 of the pulse DFF 708. To achieve a fast falling edge on the load pulse signal 1012, N-channel pull down transistors 902 are relatively large, while P-channel transistors 904 are relatively small.

With regard to the various components of the semiconductor device 204 (FIG. 2) that use a clock, it will be understood by those skilled in the art that a distributive clock can be included to provide the appropriate clock to those components. Thus, for example, a distributive clock can be provided to supply a clock signal to the shift registers and the load pulse generator.

Figure 11:
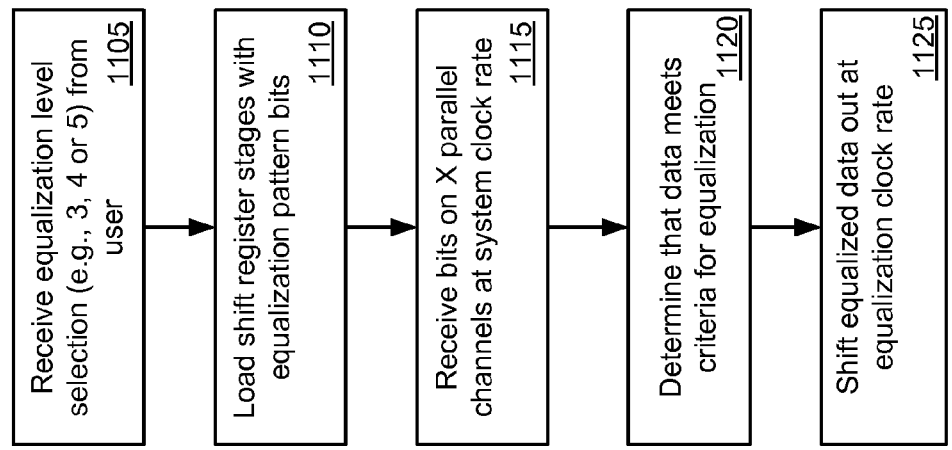
FIG. 11 is a flow chart depicting operations for carrying out equalization according to various embodiments of the present invention.

FIG. 11 is a flowchart depicting operations for data equalization according to one embodiment. In receiving operation 1105, a selection is received that indicates what level of equalization is to be applied. In one embodiment, the user can select the level of equalization. The selection may be made through hardware or software. In the illustrated embodiment, a 3-bit, 4-bit or 5-bit equalization level may be selected.

Loading operation 1110 loads an equalization pattern corresponding to the selected equalization level. In this embodiment, bits of the equalization pattern are loaded into multiple stages of X shift registers, where X corresponds to the number of data channels. Receiving operation 1115 receives system data bits on X parallel data channels from a source at a system clock rate.

Determining operation 1120 determines that the data received in receiving operation 1115 meets one or more criteria for equalization. In one embodiment, equalization criteria are met if data received on any of the X channels does not toggle sufficiently. For example, if the data on one of the X channels remains constant for a prescribed number of bits, equalization criteria are met. When equalization criteria are met, shifting operation 1125 shifts the equalization pattern out at an equalization data rate. In one embodiment, the equalization data rate is N times the system clock rate, where N is the equalization level selected in selecting operation 1105.

Figure 12:
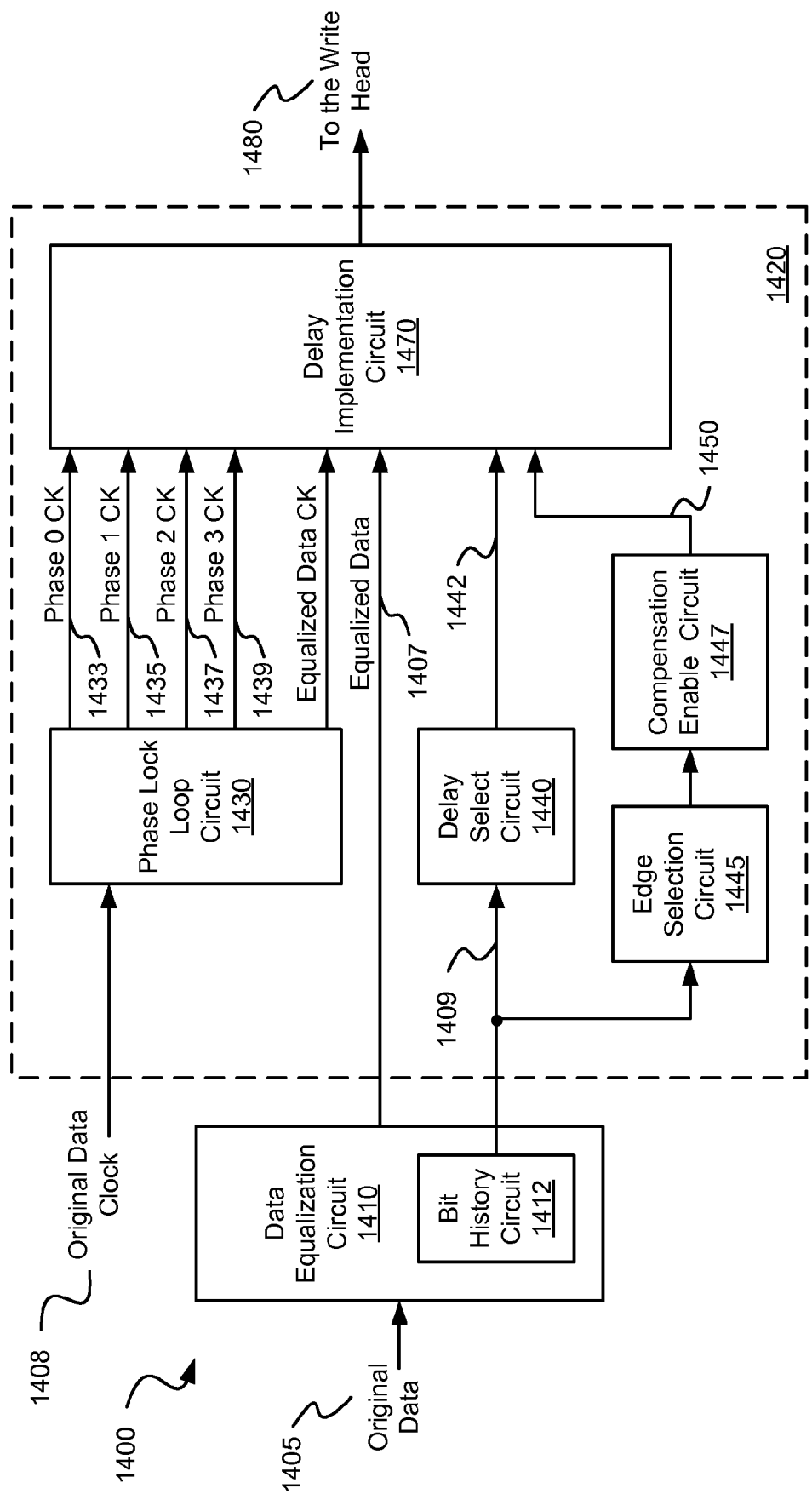
FIG. 12 is a compensation circuit in accordance with some embodiments of the present invention that allows for adjusting data writes on a sub-clock basis.

Turning to FIG. 12, a compensation circuit 1400 is shown in accordance with some embodiments of the present invention. Compensation circuit 1400 allows for adjusting data writes on a sub-clock basis. Compensation circuit 1400 includes an equalization circuit 1410 that receives original data 1405 (i.e., data prior to equalization), and provides equalized data 1407 in place of original data 1405. In some embodiments of the present invention, data equalization circuit 1410 may be implemented consistent with the circuits discussed in relation to FIGS. 2-10 above. Depending upon the particular type of equalization selected, long runs of logic '1's and logic '0's may be broken up by breaking individual bits of original data 1405 into smaller bit periods and replacing one or more of the smaller bit periods with an opposite logic value. For example, a run of three logic '1's in original data 1405 may be broken into fifteen bit periods with five bit periods representing each of the three logic '1's. The second and third of each of the five bit periods may be changed to a logic '0' to create the desired equalization. In this case, equalized data 1407 corresponding to the run of three logic '1's in original data 1405 would be represented by the following fifteen bit pattern: '100111001110011'. The following provides some examples of the equalization that may be applied using different embodiments of the present invention: $-\frac{2}{5}$th, where the data output is at five times the rate of the data input and the last two bits of the five bit equalization pattern are equalized as '11100'; $\frac{1}{5}$th, where the data output is at five times the rate of the data input and the second data bit of the five bit equalization pattern as '01000'; $\frac{1}{4}$th, where the data output is at four times the rate of the data input and the third data bit of the four bit equalization pattern as '0010'; and $\frac{1}{3}$rd, where the data output is at three times the rate of the data input and the second data bit of the three bit equalization pattern as '101'. Based upon the disclosure provided herein one of ordinary skill in the art will recognize a variety of equalization approaches and/or equalization patterns that may be used to generate equalized data 1407 from original data 1405.

In addition to the aforementioned equalization, compensation circuit 1400 provides for adjusting in time when a transition from a logic state in equalized data 1407 occurs. The adjustment may be done on a sub-clock basis. Thus, using the preceding example, the transition from the logic '1' to a logic '0' in each of the '10011' patterns may be modified on a sub-clock basis. Selection of the amount of adjustment and the edge to be adjusted is based upon the preceding pattern received as part of original data 1405. The compensation involves compensating the last transition from the previous data to the present data as long as the data is changing values between these two cycles. Thus, for example, if the original data includes a logic '0' followed by a logic '1', the logic '0' is equalized as '01001' and the logic '1' is not equalized and is represented as '11111', then the edge to compensate would be the transition from a logic '0' to a logic '1' located at bits four and five of the equalized data. To provide the bit history, data equalization circuit 1410 includes a bit history circuit 1412 that maintains a history of preceding bit patterns. In one particular embodiment, bit history circuit 1412 is implemented as a shift register with the first flip-flop in the shift register holding the most recent bit of original data 1405, and the last flip-flop in the shift register holding the bit from original data 1405 that directly precedes the data corresponding to equalized data 1407. Based upon the disclosure provided herein, one of ordinary skill in the art will recognize other possible implementations of bit history circuit 1412 depending upon particular design requirements.

Equalized data 1405, a original data clock 1408, and a bit history pattern 1409 from bit history circuit 1412 are provided to a phase shifting circuit 1420 (shown in dashed lines). Phase shifting circuit 1420 includes a phase lock loop circuit 1430 that receives original data clock 1408 and provides an equalized data clock 1432. Equalized data clock 1432 is a multiple of the frequency of original data clock 1408, where the multiple is equivalent to the level of equalization being employed. Thus, for example, where a three bit equalization is being implemented, the frequency of equalized data clock 1432 is three times that of original data clock 1408. A similar frequency multiple is used for four bit equalization, five bit equalization, or other levels of equalization. In some cases, phase lock loop circuit 1430 phase aligns equalized data clock 1432 with original data clock 1408. In addition, phase lock loop circuit 1430 provides four phases equalized data clock 1432. In particular, a phase 0 clock 1433 is provided that is in phase with equalized data clock 1432, a phase 1 clock 1435 is provided that is ninety degrees out of phase from equalized data clock 1432, a phase 2 clock 1437 is provided that is one-hundred, eighty degrees out of phase from equalized data clock 1432, and a phase 3 clock 1439 is provided that is two-hundred, seventy degrees out of phase from equalized data clock 1432.

Phase shifting circuit 1420 further includes a delay selection circuit 1440 that operates to select which how far a transition in equalized data 1407 will be shifted by providing a shift select output 1442. In effect, delay selection circuit 1440 provides shift select output 1442 that selects a combination of phase clocks 1433, 1435, 1437, 1439 to which the transition will be synchronized. Phase shifting circuit 1420 also provides a shift enable control signal 1450 that is generated using a combination of an edge selection circuit 1445 and a compensation enable circuit 1447. Edge selection circuit 1445 selects the particular transition within equalized data 1407 that will be shifted by an amount corresponding to shift select output 1442. Based on an output from edge selection circuit 1445, compensation enable circuit 1447 asserts shift enable control signal 1450 that enables adjustment of the selected transition an amount corresponding to shift select output 1442.

A delay implementation circuit 1470 receives phase clocks 1433, 1435, 1437, 1439, equalized data clock 1432, equalized data 1407, shift select output 1442, and shift enable control signal 1450. Delay implementation circuit 1470 moves the transition edge of equalized data 1407 indicated by shift enable control 1450 by an amount corresponding to shift select output 1442, and provides a data output 1480 to the downstream write head.

Figure 13:
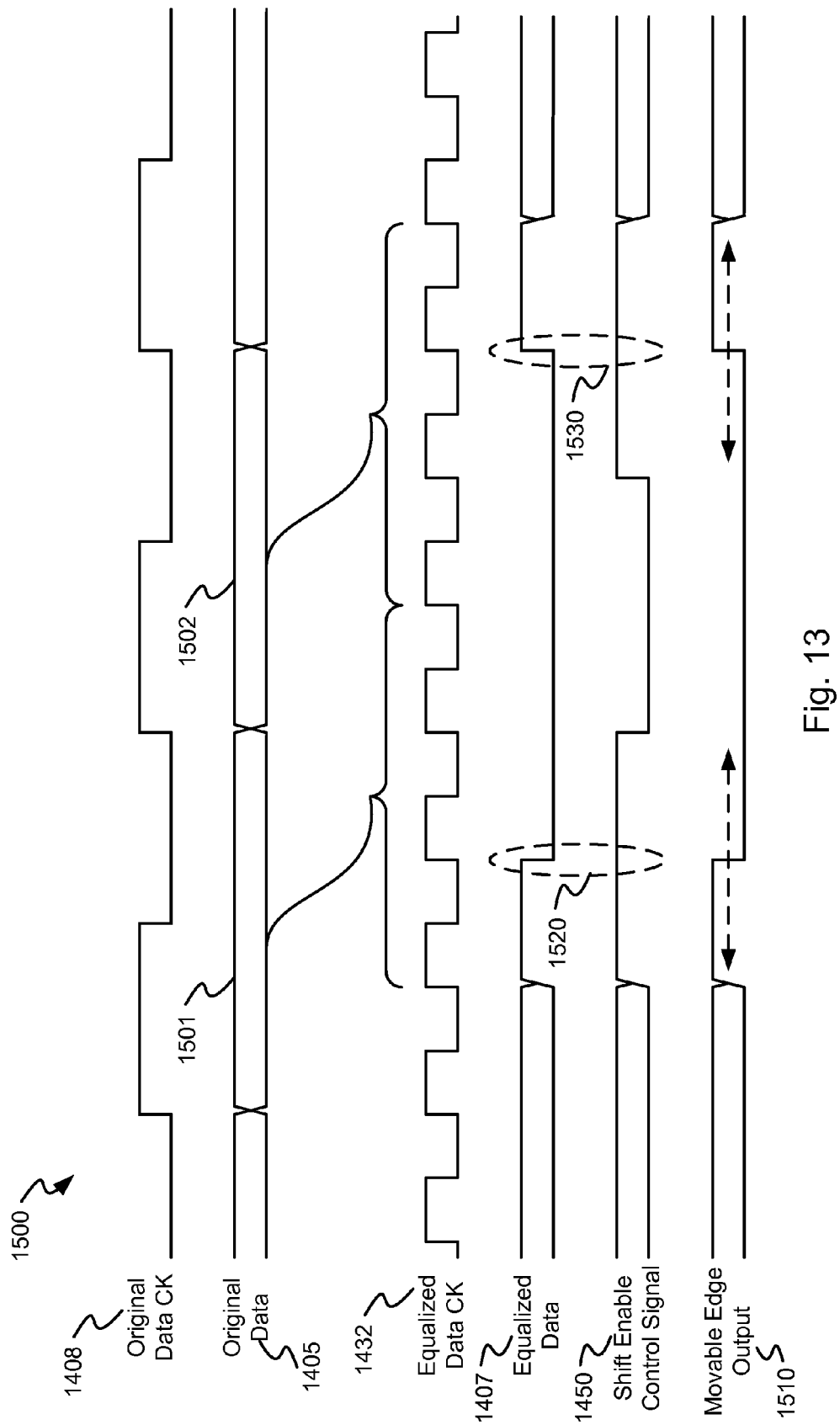
FIG. 13 is a timing diagram showing an exemplary operation of the compensation circuit of claim 12.

Turning to FIG. 13, a timing diagram 1500 shows an exemplary operation of the previously described compensation circuit 1400. In the depicted operation, a three bit equalization scheme is selected. In such a case, equalized data clock 1432 is operating at three times the frequency of original data clock 1408. Each transition of original data clock 1408 corresponds to a bit period of original data 1405, and each bit period of original data 1405 is replaced by three bit periods in equalized data 1407. In the depicted example, a first bit period 1501 of original data is replaced by a '100' bit pattern in equalized data 1407, and a second bit period 1502 of original data is replaced by a '001' bit pattern in equalized data 1407. In this case, a transition 1520 from a logic '1' to a logic '0' corresponding to first bit period 1501 is to be moved, and therefore is framed by shift enable control signal 1450; and a transition 1530 from a logic '0' to a logic '1' corresponding to second bit period 1502 is to be moved, and therefore is also framed by shift enable control signal 1450.

A conceptual data signal 1510 is shown indicating output 1480 that is provided to the head where the selected transitions are moved from a maximum of one clock cycle before the corresponding transition to one clock cycle after the corresponding transition depending upon shift select output 1442. The quantum of the shift is limited by the number of phase clocks 1433, 1435, 1437, 1439 that are available to delay implementation circuit 1470.

Figure 14A:
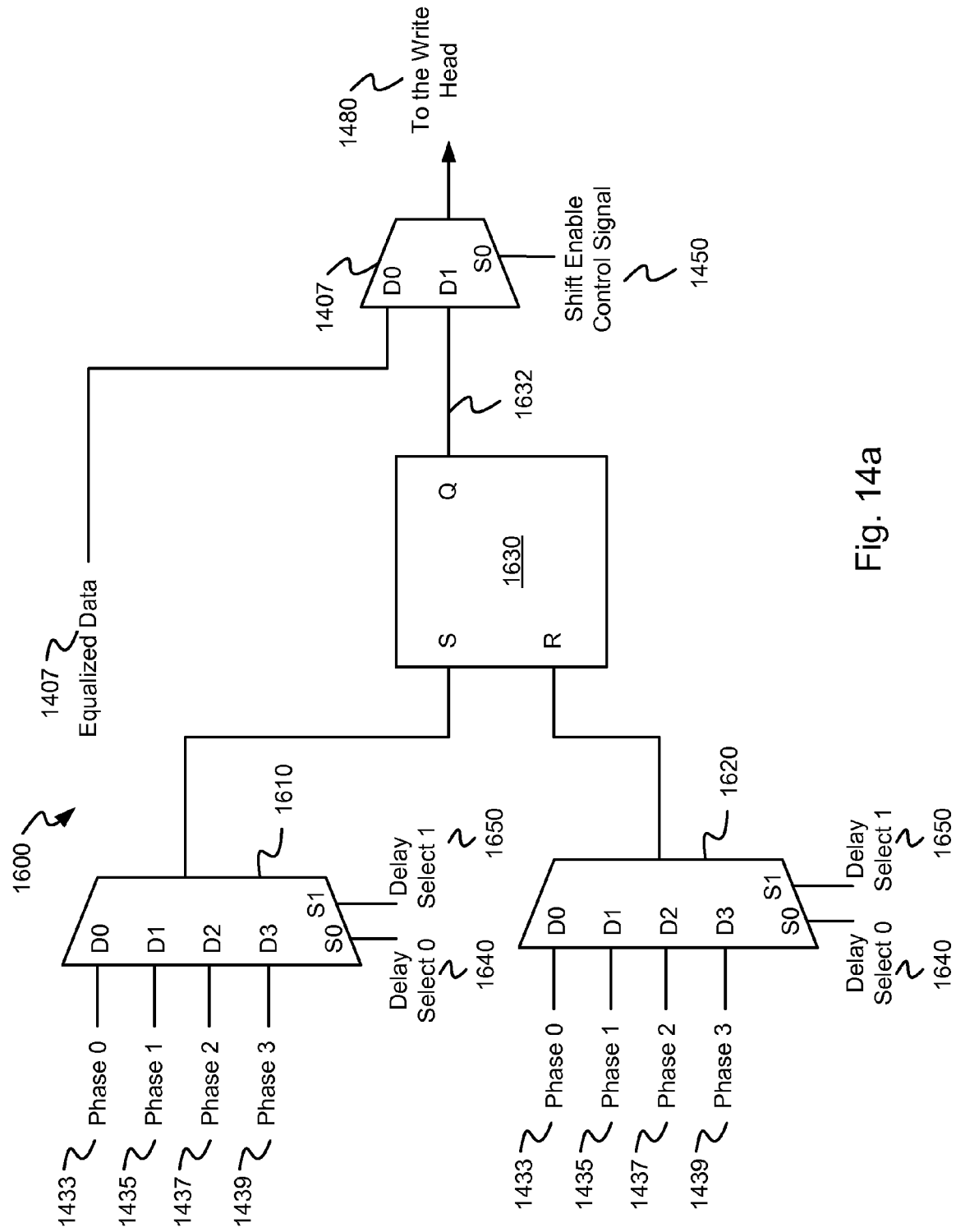
FIGS. 14a-14e depict a phase shifting circuit that may be used in relation to various embodiments of the present invention.
Figure 14B:
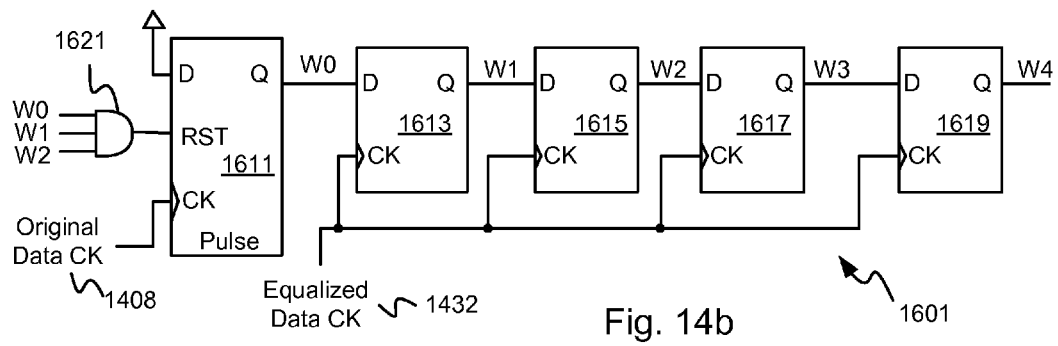

FIGS. 14a–14b depict phase selection circuitry that may be used in relation to various embodiments of the present invention. In particular, FIG. 14a shows one implementation of a transition modification circuit 1600 that may be used in relation to various embodiments of the present invention. Transition modification circuit 1600 includes two four input multiplexers 1610, 1620 that each receive as inputs phase clocks 1433, 1435, 1437, 1439. In addition, each of multiplexers 1610, 1620 receives two delay select control signals 1640, 1650. In this embodiment, delay select control signals 1640, 1650 correspond to shift select output 1442 provided by delay select circuit 1440 as was previously described above in relation to FIG. 12. Delay select control signals 1640, 1650 select which combination of phase clocks 1433, 1435, 1437, 1439 will be used for adjusting the occurrence of the selected transition. The output of multiplexer 1610 is provided as the set input to a set/reset flip-flop 1630, and the output of multiplexer 1620 is provided a the reset input to set/reset flip-flop 1630. An output 1632 of set/reset flip-flop 1630 is provided as one input to an output stage multiplexer 1660. The other input to output stage multiplexer 1660 is equalized data 1407. Shift enable control signal 1450 is provided as the select input of output stage multiplexer 1660. The output from output stage multiplexer 1660 is provides as output 1480 to the write head.

In operation, when the transition that is to be adjusted is not close to occurring, shift enable output signal 1450 is a logic '0' causing equalized data 1407 to be passed through unmodified as output 1480. In contrast, when the transition that is to be adjusted is close to occurring, shift enable output signal 1450 is a logic '1' causing output 1632 to be passed through as output 1480. Delay select control signals 1640, 1650 are adjusted such that the appropriate set and reset signals are applied to set/reset flip-flop 1630 to cause a transition at a desired distance either before or after the actual transition. This transition is reflected in output 1480.

Turning to FIG. 14b, a pulse generation circuit 1601 is shown. Pulse generation circuit 1601 includes a re-settable flip-flop 1611 that is clocked by original data clock 1408. Whenever a rising edge of original data clock 1408 occurs, an output, W0, of re-settable flip-flop 1611 is asserted high if the reset is not asserted. W0 is provided as a data input of a flip-flop 1613 that provides an output, W1; W1 is provided as a data input of a flip-flop 1615 that provides an output, W2; W3 is provided as a data input of a flip-flop 1617 that provides an output, W3; and W3 is provided as a data input of a flip-flop 1619 that provides an output, W4. Each of flip-flops 1613, 1615, 1617 and 1619 are synchronous to equalized data clock 1432. W0, W1, W2 are provided as inputs to a three input AND gate 1621, and the output of AND gate 1621 is provided as the reset input to re-settable flip-flop 1611. Thus, whenever all of W0, W1 and W2 are asserted high, W0 is asserted low through resetting of re-settable flip-flop 1611. This assertion state remains until the next rising edge of original data clock 1408. Of note, re-settable flip-flop 1611 is set synchronous to original data clock 1408, and reset quasi synchronous to equalized data clock 1432. This results in the generation of a pulse at W0 that is asserted high for approximately two periods of equalized data clock 1432, and is de-asserted for approximately one period of equalized data clock. This pulse is propagated through flip-flops 1613, 1615, 1617 and 1619 synchronous to equalized data clock 1432.

Figure 14C:
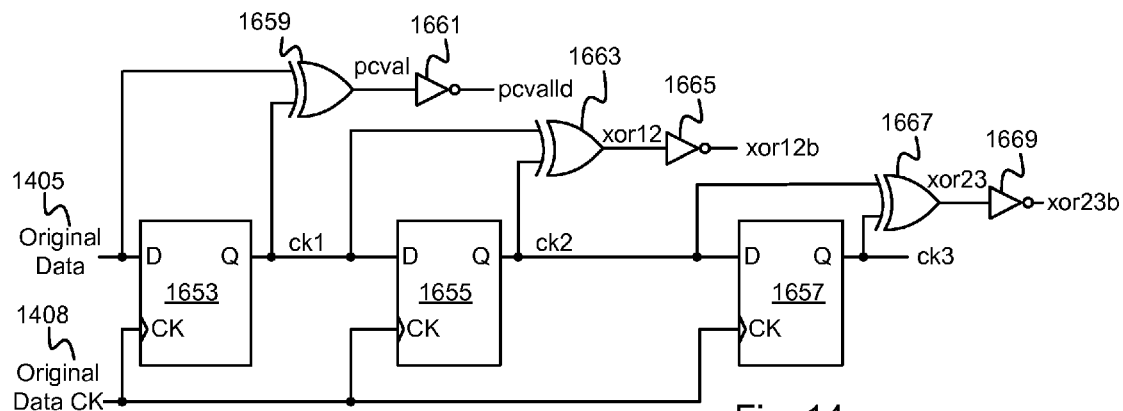

Turning to FIG. 14c, one particular implementation of a data shift circuit 1651 is shown in accordance with some embodiments of the present invention. As shown, data shift circuit 1651 receives original data 1405 and generates various delayed versions of original data 1405. The outputs of the various stages are XORed to determine if the data is changing between cycles of original data clock 1408. If a data change is detected, a pre-compensation valid (pcval) signal is asserted to identify the cycle that is to be selected for adjusting the transition point. The three bits from the outputs of flip-flops 1653, 1655, 1657 are respectively designated ck1, ck2, ck3. These outputs are XORed to generate bits used to determine the appropriate delay values (i.e., delay select signals 1640, 1650). In particular, original data 1405 and ck1 are XORed using an XOR gate 1659 to create a signal pcval. Signal pcval is inverted using an inverter 1661 to create a signal pcvalld. Ck2 and ck1 are XORed using an XOR gate 1663 to create a signal xor12. Signal xor12 is inverted using an inverter 1665 to create a signal xor12b. Ck3 and ck2 are XORed using an XOR gate 1667 to create a signal xor23. Signal xor23 is inverted using an inverter 1669 to create a signal xor23b. Signals xor12, xor12b, xor23 and xor23b form the basis for selecting which combination of phase clocks 1433, 1435, 1437, 1439 that will be used to derive the movable transition point. In particular, signals xor12, xor12b, xor23 and xor23b are provided to a delay circuit 1601 where they are used to generate delay select control signals 1640, 1650.

Figure 14D:
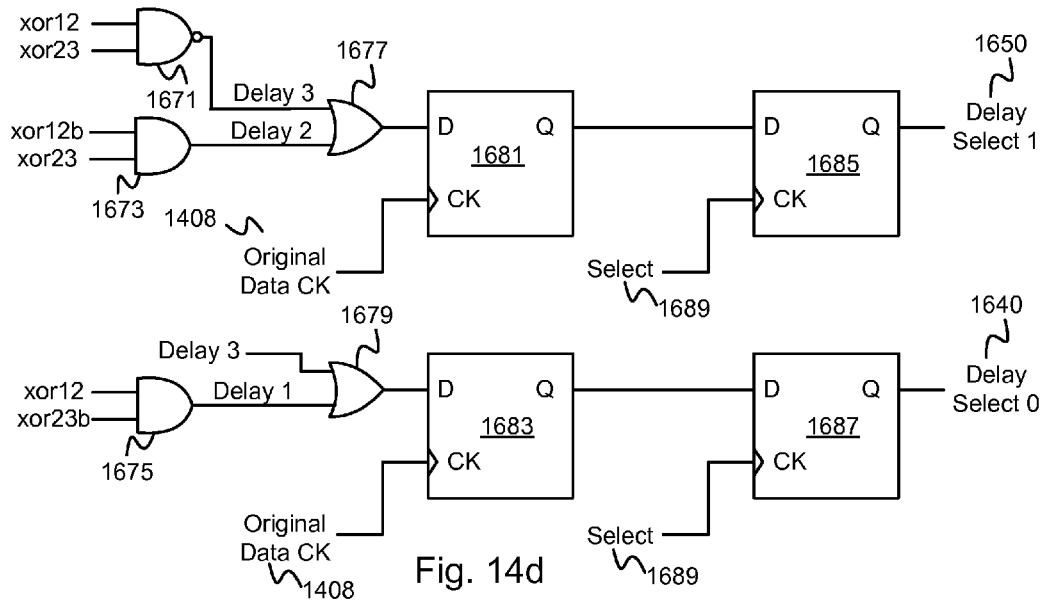

Turning to FIG. 14d, delay select circuit 1601 is shown in accordance with some embodiments of the present invention. Delay select circuit 1601 may be used in place of delay selection circuit 1440 described above in relation to FIG. 12. Delay select circuit 1601 includes a two input NAND gate 1671 that NANDs xor12 and xor23, and a two input AND gate 1673 that ANDs xor12b and xor23. The outputs of NAND gate 1671 and AND gate 1673 are ORed using an OR gate 1677. The output of OR gate 1677 is provided as the data input to a flip-flop 1681. A two input AND gate 1675 ANDs xor12 and xor23b, and the output of AND gate 1675 is ORed with the output of NAND gate 1671 using an OR gate 1679. The output of OR gate 1679 is provided as the data input to a flip-flop 1683. Flip-flop 1681 and flip-flop 1683 are each clocked by original data clock 1408. The output of flip-flop 1681 is provided as a data input to a flip-flop 1685, and the output of flip-flop 1683 is provided as a data input to a flip-flop 1687. Flip-flop 1685 and flip-flop 1687 are each clocked by a select clock 1689. Select clock 1689 is generated by a select clock generation circuit 1603 that is discussed in more detail in relation to FIG. 16e. The output of flip-flop 1685 is delay select control signal 1640, and the output of flip-flop 1687 is delay select control signal 1650.

Figure 14E:
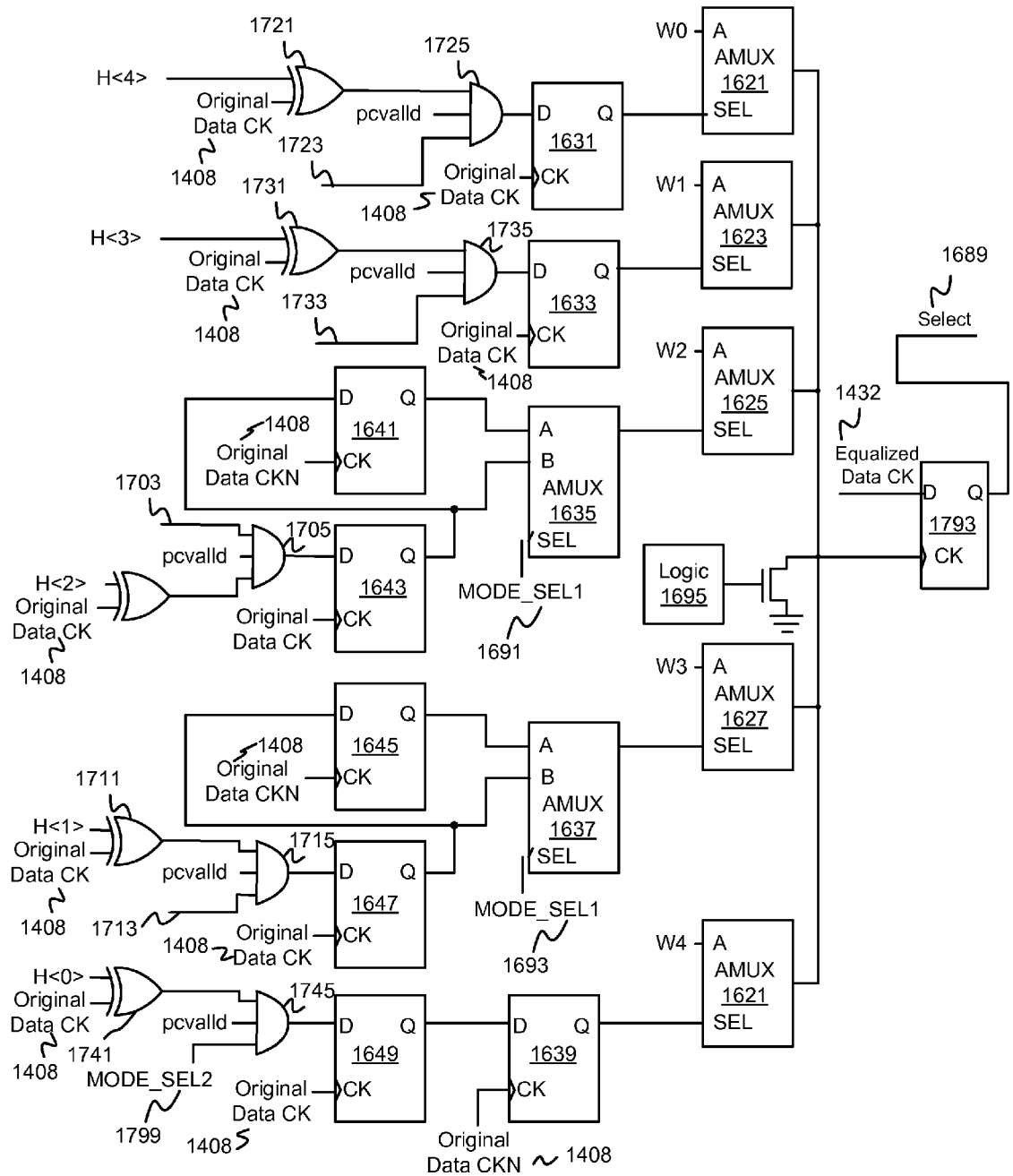

Turning to FIG. 14e, select clock generation circuit 1603 is depicted. In the circuit, the multiple equalization bits received as equalized data 1407 and corresponding to each bit of original data 1405 are identified as H<4>, H<3>, H<2>, H<1>, H<0>. The most significant bit, H<4>, (the most significant bit may be either H<4>, H<3> or H<2> depending upon whether five bit, four bit, or three bit equalization is selected) is the first serial bit output in the data stream followed thereafter in order of significance until the least significant bit, is output. The least significant bit may be either H<2>, H<1> or H<0> depending upon whether three bit, four bit or five bit equalization is selected. A later circuit performs any necessary shifting to assure that H<4> is always the most significant bit. H<0> is the fifth bit when five bit equalization is selected. If H<0> is different than original data 1405, original data 1405 is transitioning, pcvalid is asserted high, and the five bit equalization mode is selected (i.e., MODE-_SEL1 1693 is asserted), then H<0> should be compensated (i.e., an output of AND gate 1745 is asserted). The output of AND gate 1745 is captured on original data clock 1405 and re-captured on the negative edge of original data clock 1405 to delay the enable signal. The negative edge delay is used so that the enable (enpcbit4) can be held high across the boundary of original data clock 1405 since the pulse from pulse generation circuit 1601 is two clocks wide.

H<3> is the fourth bit whenever four bit or five bit equalization is selected. If H<3> is different than original data 1407, pcvalid is asserted high, and the four bit equalization mode is selected (MODE_SEL0 1691 is asserted), then this bit should be compensated. In a four bit equalization scheme, this is the least significant bit so the enable signal is shifted by a half of a cycle of original clock 1405 to account for the boundary of original clock 1405. If five bit equalization is selected, the output of AND gate 1745 is de-asserted and the output of AND gate 1715 is asserted. H<2> operates as the 3rd bit in either a three bit equalization scheme, a four bit equalization scheme, or a five bit equalization scheme. If H<2> is different than original data 1405, pcvalid is asserted high, and a three bit equalization scheme is selected (MODE-_SEL2 1799 us asserted and MODE_SEL1 1693 is not asserted), then this bit should be compensated. In the three bit equalization mode, H<2> is the last bit so the enable bit is shifted by a half cycle of original data clock 1405 to account for the boundary of original data clock 1405. If either the four bit equalization mode or five bit equalization mode is selected, then the output of AND gate 1715 is low. Where the five bit equalization mode is selected, then the output of both AND gate 1715 and AND gate 1745 are low. H<1> is always the second bit in the data stream. If H<1> is different than original data 1405, pcvalid is asserted high, and the output of AND gates 1745, 1715, 1705 are all low, then this bit should be compensated. H<0> is always the first bit in the data stream. If H<0> is different than original data 1405, pcvalid is asserted high, and the output of AND gates 1745, 1715, 1705, 1735 are all low, then this bit should be compensated. A logic block 1695 is employed to pull a clock input of an output flip-flop 1793 low when none of the enables (i.e., select inputs to analog multiplexers 1621, 1623, 1625, 1627, 1629) are enabled to prevent an invalid state of select clock 1689.

In more detail, select clock generation circuit 1603 includes a number of analog multiplexers 1621, 1623, 1625, 1627, 1629 that each pass through the respective pulse signal, W0, W1, W2, W3, W4 whenever the corresponding select input is asserted high, and appears as an open switch whenever the corresponding select input is asserted low. The corresponding select inputs are driven by respective flip-flops 1631, 1633, 1639, and respective analog multiplexers 1635, 1637. In particular, flip-flop 1631 drives the select input corresponding to W0 synchronous to original data clock 1408; flip-flop 1633 drives the select input corresponding to W1 synchronous to original data clock 1408; and flip-flop 1639 drives the select input corresponding to W4 synchronous to the inverse of original data clock 1408.

The data input of flip-flop 1631 is driven by a set of logic including an XOR gate 1721, an input 1723, and a three input AND gate 1725. AND gate 1725 ANDs the signal pcvalld from bit history circuit 1651 with input 1723 and the output of XOR gate 1721. XOR gate 1721 XORs original data clock 1408 with equalization bit H<4>; and input 1723 is asserted high when none of the previous bits (1-4) in the sequence have been selected for transition adjustment assuring that only one bit is compensated. The data input of flip-flop 1633 is driven by a set of logic including an XOR gate 1731, an input 1733, and a three input AND gate 1735. AND gate 1735 ANDs the signal pcvalld from bit history circuit 1651 with input 1733 and the output of XOR gate 1731. XOR gate 1731 XORs original data clock 1408 with equalization bit H<3>; and input 1733 is asserted high when none of the previous bits (2-4) in the sequence have been selected for transition adjustment assuring that only one bit is compensated. The data input of flip-flop 1639 is driven by a set of logic including an XOR gate 1741 and a three input AND gate 1745. AND gate 1745 ANDs the signal pcvalld from bit history circuit 1651 with the output of XOR gate 1741 and MODE_SEL2 signal 1799. XOR gate 1741 XORs original data clock 1408 with equalization bit H<0>.

Analog multiplexer 1635 passes either the output of a flip-flop 1641 or the output of a flip-flop 1643 as the select input corresponding to W2 depending upon MODE_SEL1 input 1691. Flip-flop 1641 is synchronized to the inverse of original data clock 1408 with the data input being received from the output of flip-flop 1643. Flip-flop 1643 is synchronized to original data clock 1408. The data input of flip-flop 1643 is driven by a set of logic including an XOR gate 1701, an input 1703, and a three input AND gate 1705. AND gate 1705 ANDs the signal pcvalld from bit history circuit 1651 with input 1703 and the output of XOR gate 1701. XOR gate 1701 XORs original data clock 1408 with equalization bit H<2>; and input 1703 is asserted as a logic '1' whenever a five bit equalization is selected and the previous two bits are not selected for compensation, or whenever three bit equalization is selected, or whenever four bit equalization is selected and the preceding bit was not selected for compensation. This assures that only one transition is selected for adjustment.

Analog multiplexer 1637 passes either the output of a flip-flop 1645 or the output of a flip-flop 1647 as the select input corresponding to W2 depending upon MODE_SEL1 input 1693. Flip-flop 1645 is synchronized to the inverse of original data clock 1408 with the data input being received from the output of flip-flop 1647. Flip-flop 1647 is synchronized to original data clock 1408. The data input of flip-flop 1647 is driven by a set of logic including an XOR gate 1711, an input 1713, and a three input AND gate 1715. AND gate 1715 ANDs the signal pcvalld from bit history circuit 1651 with input 1713 and the output of XOR gate 1711. XOR gate 1711 XORs original data clock 1408 with equalization bit H<1>; and input 1713 is asserted as a logic '1' whenever four bit equalization is selected, or five bit equalization is selected and the fourth transition is not selected for adjustment. This assures that only one transition is selected for adjustment.

Figure 15:
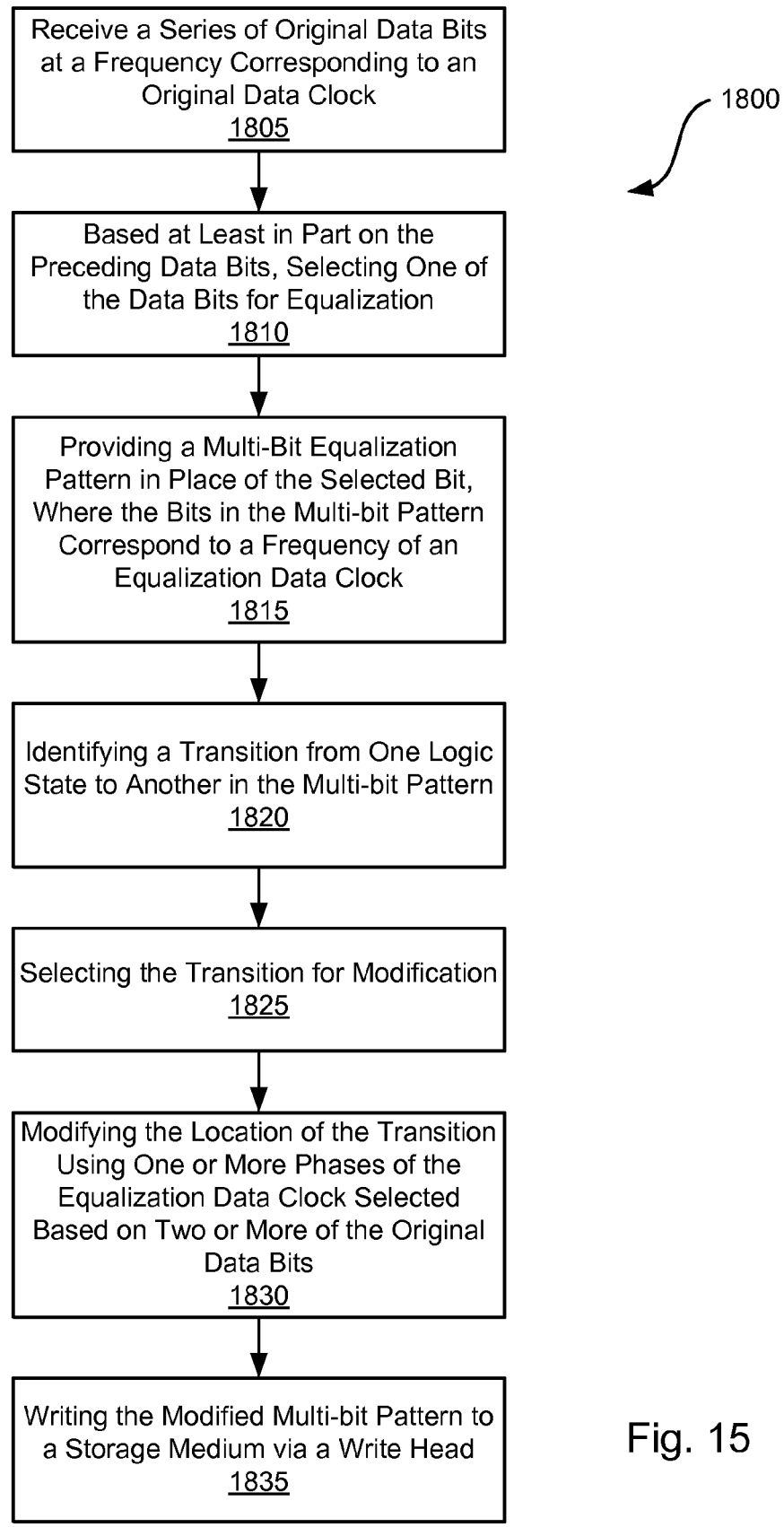
FIG. 15 depicts a method in accordance with some embodiments of the present invention for modifying the occurrence of a transition within a equalization pattern on a sub-equalization data clock basis.

Turning to FIG. 15, a flow diagram 1800 depicts a method in accordance with some embodiments of the present invention for modifying the occurrence of a transition within a equalization pattern on a sub-equalization data clock basis. Following flow diagram 1800, a series of original data bits are received at a frequency corresponding to an original data clock (block 1805). Based at least in part on one or more preceding data bits, one of the original data bits is selected for equalization (block 1810). The selected bit is replaced by a multi-bit equalization pattern (block 1815). The frequency of the bits in the multi-bit equalization pattern correspond to an equalization data clock. A transition within the multi-bit equalization pattern is identified (block 1820). This may include identifying a transition from a logic '1' to a logic '0' between two bits of the equalization pattern or between a bit of the equalization pattern and a bit directly preceding or succeeding the equalization pattern, or a transition from a logic '0' to a logic '1' between two bits of the equalization pattern or between a bit of the equalization pattern and a bit directly preceding or succeeding the equalization pattern. The identified transition may then be selected for modification (block 1825). The identified transition is then modified (block 1830). Modification includes moving the occurrence of the transition in time either before or after the original occurrence of the transition. The location to which the transition is moved is synchronized to one or a combination of phases of the equalization data clock. Once the modification is complete, the modified equalization pattern is written to a storage medium via a write head.

Figure 16:
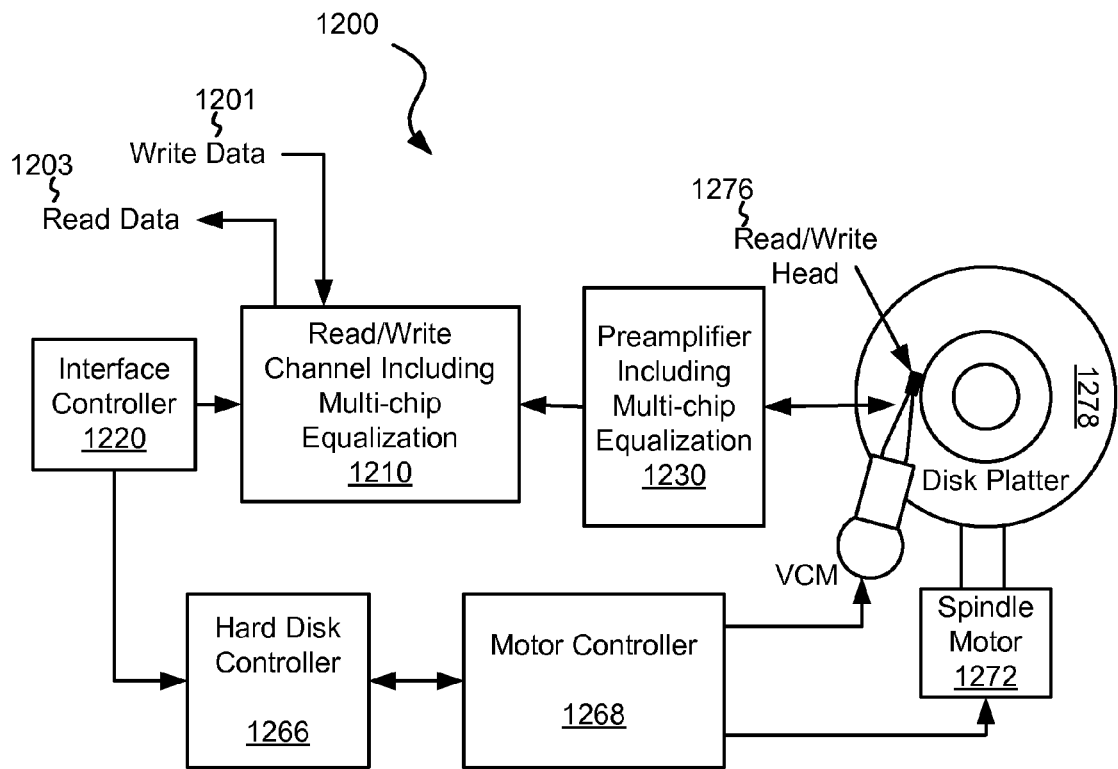
FIG. 16 is a data storage system including a read/write channel and preamplifier that together include a multi-chip equalization system in accordance with various embodiments of the present invention.

Turning to FIG. 16, a data storage system 1200 is shown in accordance with various embodiments of the present invention. Data storage system 1200 may be, for example, a hard disk drive. Data storage system 1200 includes a read/write channel 1210 coupled to a preamplifier 1230 that together include a multi-chip equalization system. In some embodiments of the present invention, the multi-chip equalization system is implemented similar to that discussed above in relation to FIGS. 2-10 and 12-14. Read/write channel 1210 receives information obtained from a disk platter 1278 via a read/write head assembly 1276 and preamplifier 1230. In addition, data storage system 1200 includes an interface controller 1220, a hard disk controller 1266, a motor controller 1268, and a spindle motor 1272. Interface controller 1220 controls addressing and timing of data to/from disk platter 1278. The data on disk platter 1278 consists of groups of magnetic signals that may be detected by read/write head assembly 1276 when the assembly is properly positioned over disk platter 1278. In a typical read operation, read/write head assembly 1276 is accurately positioned by motor controller 1268 over a desired data track on disk platter 1278. Motor controller 1268 both positions read/write head assembly 1276 in relation to disk platter 1278 and drives spindle motor 1272 by moving read/write head assembly 1276 to the proper data track on disk platter 1278 under the direction of hard disk controller 1266. Spindle motor 1272 spins disk platter 1278 at a determined spin rate (RPMs).

Once read/write head assembly 1276 is positioned adjacent the proper data track, magnetic signals representing data on disk platter 1278 are sensed by read/write head assembly 1276 as disk platter 1278 is rotated by spindle motor 1272. The sensed magnetic signals are provided as a continuous, minute analog signal representative of the magnetic data on disk platter 1278. This minute analog signal is transferred from read/write head assembly 1276 to read/write channel module 1210 via preamplifier 1230. Preamplifier 1230 is operable to amplify the minute analog signals accessed from disk platter 1278. In turn, read channel module 1210 decodes and digitizes the received analog signal to recreate the information originally written to disk platter 1278. In addition, preamplifier 1230 is operable to equalize and amplify data from read channel module 1210 that is destined to be written to disk platter 1278. The equalized data is then provided to read/write head assembly that writes the equalized data to disk platter 1278.

Figure 17:
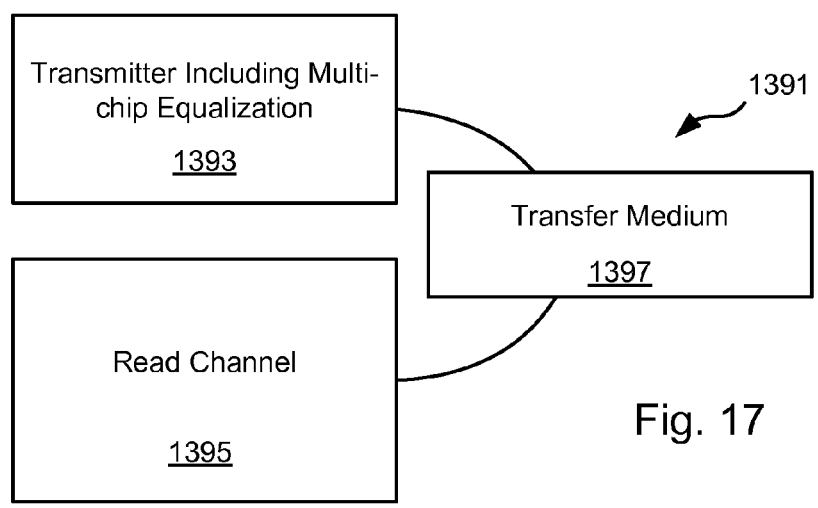
FIG. 17 is a data transmission system including a transmitter with a multi-chip equalization system in accordance with some embodiments of the present invention.

Turning to FIG. 17, a communication system 1391 including a transmitter 1393 with a multi-chip equalization system. Communication system 1391 includes a receiver 1393 that is operable to receive equalized information via a transfer medium 1397 as is known in the art. Transmitter 1393 incorporates a multi-chip equalization system to that discussed above in relation to FIGS. 2-10 and 12-14. It should be noted that transfer medium 1397 may be any medium whereby information is transferred including, but not limited to, a wired interface, an optical interface, a wireless interface, and/or combinations thereof. Based on the disclosure provided herein, one of ordinary skill in the art will recognize a variety of mediums that may include defects and that may be utilized in relation to different embodiments of the present invention.

In conclusion, the present invention provides novel systems, devices, methods and arrangements for data equalization. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A semiconductor device comprising:
   a shift register including at least N stages, wherein each stage is operable to load a bit of equalization data in response to a load pulse and to shift the bit in response to a rising edge of a first clock having a first data rate, wherein the load pulse is used to select between loading a new bit of equalization data or a bit from a prior stage; and
   a load pulse generator operable to assert the load pulse in response to a rising edge of a second clock having a second data rate, and to de-assert the load pulse prior to the rising edge of the first clock, wherein the first data rate is N times the second data rate.

2. The semiconductor device of claim 1, wherein each stage of the shift register comprises a multiplexer operable to select between the new bit of equalization data and a bit from a prior stage of the shift register based on the load pulse.

3. The semiconductor of device claim 2, wherein each stage further comprises a hybrid flip-flop, wherein the first clock is input to a clock port of the hybrid flip-flop and the output of the multiplexer in each stage is input to a data port of the hybrid flip-flop.

4. The semiconductor device of claim 1, wherein N is selected from a group consisting of: three, four, and five.

5. The semiconductor of device claim 1, wherein the second clock is a system data clock used to clock bits of system data and the first clock is an equalization data clock used to clock bits of equalization patterns representing one or more of the system data.

6. The semiconductor device of claim 1, wherein the value of N is programmable.

7. The semiconductor device of claim 1, wherein the semiconductor device is operable to receive system data from a processor outputting system data at the second data rate, and wherein the processor is implemented on a Silicon semiconductor and the semiconductor device is composed of Silicon Germanium.

8. The semiconductor device of claim 1, wherein the semiconductor device is implemented as part of a storage device.

9. A storage device, the storage device comprising:
a read/write head assembly operable to write data to a storage medium;
a processor operable to generate system data on a plurality of parallel data channels at a system clock rate; and
a semiconductor device operable to receive the system data and generate equalization data corresponding to each parallel channel, wherein the equalization data is generated at an equalization clock rate that is N times the system clock rate, wherein the semiconductor device includes a shift register associated with each data channel, wherein each shift register includes at least N stages, wherein each stage is operable to select between loading a new equalization data bit or a bit from a prior stage; wherein each stage of each shift register selects whether to load a new equalization data bit or a bit from a prior stage based on a load pulse, and wherein the semiconductor device further comprises a load pulse generator operable to generate the load pulse, wherein the load pulse rises in response to a rising edge of the system clock and falls prior to a next rising edge of the equalization clock.

10. The storage device of claim 9, wherein each stage of each shift register comprises a multiplexer operable to select between a bit from a prior stage and a new equalization bit.

11. The storage device of claim 10, wherein each stage of each shift register further comprises a hybrid flip-flop, wherein a clock port of each hybrid flip-flop receives the equalization clock and a data port of the each hybrid flip-flop receives the output of a multiplexer of the stage.

12. The storage device of claim 10, the storage device further comprising a selection means for programming the value of N.

13. The storage device of claim 10, wherein N is selected from a group consisting of: three, four, and five.

14. The storage device of claim 9, wherein the value of N is programmable.

15. The storage device of claim 9, wherein the semiconductor device is operable to receive system data from a processor outputting system data at the second data rate, and wherein the processor is implemented on a Silicon semiconductor and the semiconductor device is composed of Silicon Germanium.

16. A method for generating equalization data, the method comprising:
inputting N bits of an equalization data pattern into respective stages of a shift register, wherein inputting the N bits occurs synchronous to a system data clock having a system data rate;
shifting the N bits of equalization data to next adjacent stages of the shift register synchronous to an equalization data clock having an equalization data rate N times the system data rate; and
generating a load pulse operable to select a new equalization bit at each stage or a bit from a prior stage, wherein generating the load pulse comprises generating a rising edge of the load pulse in response to receiving a rising edge of the system data clock and generating a falling edge of the load pulse prior to receiving a next rising edge of the equalization data clock.

17. The method of claim 16, wherein generating the load pulse comprises generating one or more delayed versions of the system data clock.

18. The method of claim 16, further comprising receiving a selection indicating a level of equalization.

19. The method of claim 18, wherein receiving the selection of N comprises receiving the selection from a user.

20. The method of claim 16, further comprising generating the equalization pattern based on N.

* * * * *